(12) United States Patent
Kim et al.

(10) Patent No.: US 9,971,435 B2
(45) Date of Patent: May 15, 2018

(54) METHOD FOR TRANSMITTING EMOTION AND TERMINAL FOR THE SAME

(71) Applicant: HiDeep Inc., Gyeonggi-do (KR)

(72) Inventors: Yunjoung Kim, Gyeonggi-do (KR);
Seyeob Kim, Gyeonggi-do (KR);
Sangsic Yoon, Gyeonggi-do (KR);
Bonkee Kim, Gyeonggi-do (KR);
Hojun Moon, Gyeonggi-do (KR);
Taehoon Kim, Gyeonggi-do (KR);
Sunyoung Kwon, Gyeonggi-do (KR)

(73) Assignee: HIDEEP INC. (KR)

( * ) Notice: Subject to any disclaimer, the term of this patent is extended or adjusted under 35 U.S.C. 154(b) by 61 days.

(21) Appl. No.: 14/666,352

(22) Filed: Mar. 24, 2015

(65) Prior Publication Data
US 2015/0268780 A1    Sep. 24, 2015

(30) Foreign Application Priority Data

Mar. 24, 2014 (KR) .................. 10-2014-0034169
May 9, 2014 (KR) .................. 10-2014-0055732
(Continued)

(51) Int. Cl.
*G06F 3/041* (2006.01)
*H04L 12/58* (2006.01)

(52) U.S. Cl.
CPC .......... *G06F 3/0412* (2013.01); *H04L 51/10* (2013.01); *G06F 2203/011* (2013.01); *G06F 2203/04105* (2013.01)

(58) Field of Classification Search
CPC ............ G06F 3/0412; G06F 2203/011; G06F 2203/04105; G06F 3/041–3/047; H04L 51/32
(Continued)

(56) References Cited

U.S. PATENT DOCUMENTS 7,312,791 B2 * 12/2007 Hoshino ............... F16M 11/10
345/173
8,493,354 B1 * 7/2013 Birnbaum ............... G06F 3/016
340/407.2
(Continued)

FOREIGN PATENT DOCUMENTS

EP    2869174    5/2015
JP    2009163363    7/2009
(Continued)

OTHER PUBLICATIONS

Corresponding Office Action issued by the KIPO dated Dec. 16, 2015.
(Continued)

*Primary Examiner* — Stephen Sherman
(74) *Attorney, Agent, or Firm* — The Belles Group, P.C.

(57) ABSTRACT

A method for transmitting emotions in accordance with a touch pressure, a touch area and a touch time period may include: determining characteristics of a message; detecting at least one of the magnitude of the touch pressure, touch area, and touch time period of the touch when the touch is input to a touch screen of a sender's terminal; changing state information of the characteristics in accordance with at least one of the detected magnitude of the touch pressure, touch area, and touch time period of the touch; and transmitting the message including the changed state information.

17 Claims, 26 Drawing Sheets

(30) Foreign Application Priority Data

| Aug. 1, 2014 | (KR) | 10-2014-0098917 |
| Sep. 19, 2014 | (KR) | 10-2014-0124920 |
| Oct. 24, 2014 | (KR) | 10-2014-0145022 |
| Dec. 22, 2014 | (KR) | 10-2014-0186352 |
| Feb. 11, 2015 | (KR) | 10-2015-0020811 |

(58) Field of Classification Search
USPC .................................. 345/174; 178/18.06
See application file for complete search history.

(56) References Cited

U.S. PATENT DOCUMENTS

| 2002/0038157 | A1* | 3/2002 | Dowling | A63J 17/00 |
| | | | | 700/90 |
| 2004/0070573 | A1* | 4/2004 | Graham | G06F 3/04883 |
| | | | | 345/179 |
| 2004/0174399 | A1* | 9/2004 | Wu | G06F 17/24 |
| | | | | 715/863 |
| 2006/0123159 | A1* | 6/2006 | Clow | G06F 3/0481 |
| | | | | 710/48 |
| 2008/0287147 | A1* | 11/2008 | Grant | G06F 1/1626 |
| | | | | 455/466 |
| 2009/0183931 | A1* | 7/2009 | Okano | G06F 3/0416 |
| | | | | 178/18.03 |
| 2011/0050629 | A1 | 3/2011 | Fuminori et al. | |
| 2011/0242024 | A1 | 10/2011 | Fukumoto et al. | |
| 2011/0304643 | A1* | 12/2011 | Marison | G06F 3/04883 |
| | | | | 345/611 |
| 2013/0009653 | A1 | 1/2013 | Fukushima | |
| 2013/0201133 | A1* | 8/2013 | Oh | G06F 3/04883 |
| | | | | 345/173 |
| 2013/0249919 | A1 | 9/2013 | Osada | |
| 2013/0300688 | A1 | 11/2013 | Inamoto | |
| 2013/0307788 | A1 | 11/2013 | Rao et al. | |
| 2013/0328803 | A1 | 12/2013 | Fukushima et al. | |
| 2014/0176477 | A1 | 6/2014 | Nakao | |
| 2014/0210730 | A1* | 7/2014 | Mankowski | G06F 3/041 |
| | | | | 345/173 |
| 2015/0002434 | A1 | 1/2015 | Tsukahara et al. | |
| 2015/0062052 | A1* | 3/2015 | Bernstein | G06F 3/0416 |
| | | | | 345/173 |

FOREIGN PATENT DOCUMENTS

| JP | 2010278726 | 12/2010 |
| JP | 2011022958 | 2/2011 |
| JP | 2011053971 | 3/2011 |
| JP | 2011165023 | 8/2011 |
| JP | 2011210009 | 10/2011 |
| JP | 2012008666 | 1/2012 |
| JP | 2012053581 | 3/2012 |
| JP | 2013020370 | 1/2013 |
| JP | 2013099380 | 5/2013 |
| JP | 2013122625 | 6/2013 |
| JP | 2013134532 | 7/2013 |
| JP | 2013196661 | 9/2013 |
| JP | 2013235413 | 11/2013 |
| JP | 2013242916 | 12/2013 |
| JP | 2013257657 | 12/2013 |
| JP | 5429726 | 2/2014 |
| KR | 101201414 | 2/2010 |
| KR | 1020140035160 | 3/2014 |
| WO | 2014000543 | 1/2014 |

OTHER PUBLICATIONS

Corresponding Office Action issued by the JPO dated Nov. 1, 2016.
Corresponding Office Action issued by the JPO dated Mar. 29, 2016.
Corresponding final rejection issued by the KIPO dated Jun. 30, 2017.

* cited by examiner

METHOD FOR TRANSMITTING EMOTION AND TERMINAL FOR THE SAME

CROSS REFERENCE TO RELATED APPLICATIONS

Priority is claimed under 35 U.S.C. § 119 to Korean Patent Application No.: 10-2014-0034169, filed Mar. 24, 2014, Korean Patent Application No.: 10-2014-0055732, filed May 9, 2014, Korean Patent Application No.: 10-2014-0098917, filed Aug. 1, 2014, Korean Patent Application No.: 10-2014-0124920, filed Sep. 19, 2014, Korean Patent Application No.: 10-2014-0145022, filed Oct. 24, 2014, Korean Patent Application No.: 10-2014-0186352, filed Dec. 22, 2014, and Korean Patent Application No.: 10-2015-0020811, filed Feb. 11, 2015, the disclosures of which are incorporated herein by reference in their entireties.

FIELD OF THE INVENTION

The present invention relates to a method for transmitting emotions in accordance with a touch pressure, touch area and touch time period, and to a terminal for the same.

BACKGROUND OF THE INVENTION

A variety of input devices are being used to operate a computing system. For example, input devices like a button, a key, a joystick and a touch screen are being used. Since the touch screen is easy and simple to operate, the touch screen is increasingly being used in operation of the computing system.

The touch screen may include a touch sensor panel which may be a transparent panel including a touch-sensitive surface. Such a touch sensor panel is attached to the front side of a display panel, and then the touch-sensitive surface may cover the visible side of the display panel. The touch screen allows a user to operate the computing system by simply touching the screen by a finger, etc. In general, the touch screen recognizes the touch on the panel and touch position, and then the computing system analyzes the touch and performs operations in accordance with the analysis. Also, research is being devoted to the touch sensor panel capable of sensing the magnitude of the pressure of the touch on the touch screen.

The computing device is being widely used as an important communication means which makes it possible to transmit and share human thought and emotion. Therefore, such a computing device requires an interaction technology capable of more easily transmitting the state information to the other party.

SUMMARY OF THE INVENTION

One embodiment is a method for transmitting emotions in accordance with a touch pressure, a touch area and a touch time period. The method includes: detecting at least one of the magnitude of the touch pressure, touch area, and touch time period of a touch input to a touch screen; changing characteristics of a message in accordance with at least one of the detected magnitude of the touch pressure, touch area, and touch time period; and transmitting the message with the changed characteristics.

Another embodiment is a terminal for transmitting emotions in accordance with a touch pressure, a touch area and a touch time period. The terminal includes: a touch screen; a communication module; a processor which detects at least one of a magnitude of the touch pressure and touch area of the touch input to the touch screen; and a controller which changes characteristics of a message in accordance with at least one of the magnitude of the touch pressure and touch area of the touch and transmits the message with the changed characteristics through the communication module.

Further another embodiment is a terminal for transmitting emotions in accordance with a touch pressure, a touch area and a touch time period. The terminal includes: a touch screen; a communication module; a processor which detects a capacitance change amount due to the touch input to the touch screen; and a controller which calculates the touch time period by using the capacitance change amount, changes characteristics of a message in accordance with the touch time period of the touch, and transmits the message with the changed characteristics through the communication module.

Yet another embodiment is a terminal for transmitting emotions in accordance with a touch pressure, a touch area and a touch time period. The terminal includes: a touch screen; a communication module; a processor which detects at least one of a magnitude of the touch pressure and touch area of the touch input to the touch screen and detects a capacitance change amount due to the touch; and a controller which calculates the touch time period by using the capacitance change amount, changes characteristics of a message in accordance with at least one of the magnitude of the touch pressure, touch area, and touch time period of the touch, and transmits the message with the changed characteristics through the communication module.

DETAILED DESCRIPTION OF THE INVENTION

Figure 1:
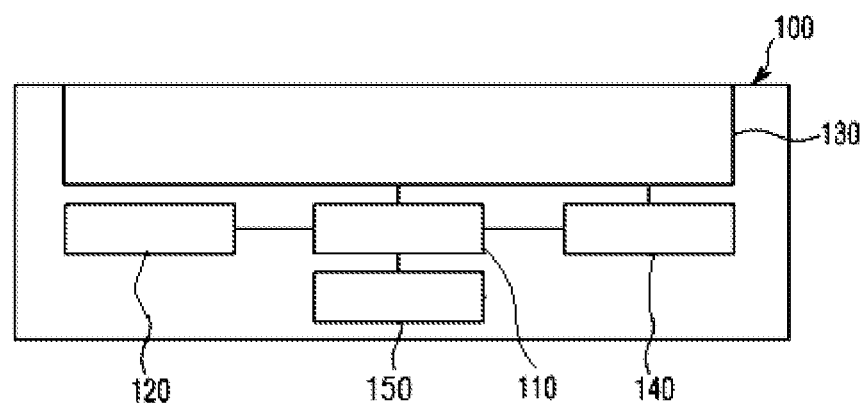
FIG. 1 is a structure view of a terminal according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. The following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a terminal 100 including a touch screen 130 according to the embodiment of the present invention will be described with reference to the accompanying drawings. Prior to the description of the functions and features of the terminal 100 according to the embodiment of the present invention, the touch screen 130 included in the terminal 100 will be described in detail with reference to FIGS. 10 to 18.

Figure 10:
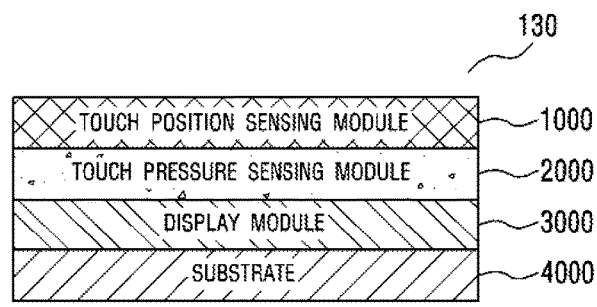
FIG. 10 shows a structure of the touch screen according to the first embodiment.

FIG. 10 shows a structure of the touch screen according to a first embodiment.

As shown in FIG. 10, the touch screen 130 may include a touch position sensing module 1000, a touch pressure sensing module 2000 disposed under the touch position sensing module 1000, a display module 3000 disposed under the touch pressure sensing module 2000, and a substrate 4000 disposed under the display module 3000. For example, the touch position sensing module 1000 and the touch pressure sensing module 2000 may be a transparent panel including a touch-sensitive surface. Hereafter, the modules 1000, 2000, 3000 and 5000 for sensing the touch position and/or touch pressure may be collectively designated as a touch sensing module.

The display module 3000 can display the screen to allow a user to visually check contents. Here, the display module 3000 may display by means of a display driver. The display driver (not shown) is a software allowing an operating system to manage or control a display adaptor and is a kind of a device driver.

Figure 18A:
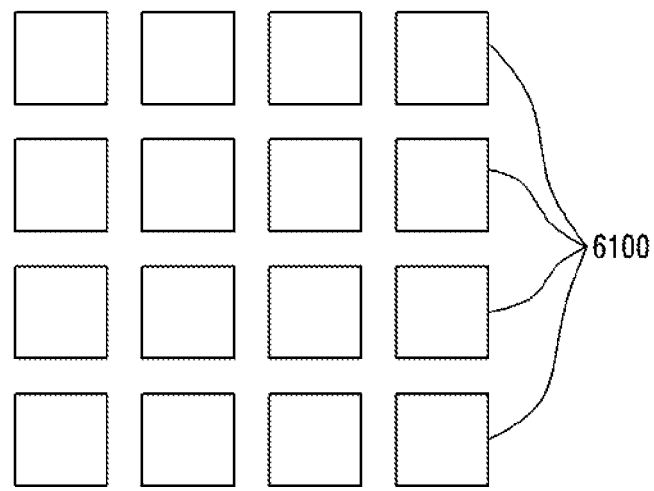
FIGS. 18a to 18d are structure views showing the shape of an electrode formed in the touch sensing module according to the embodiment.
Figure 18B:
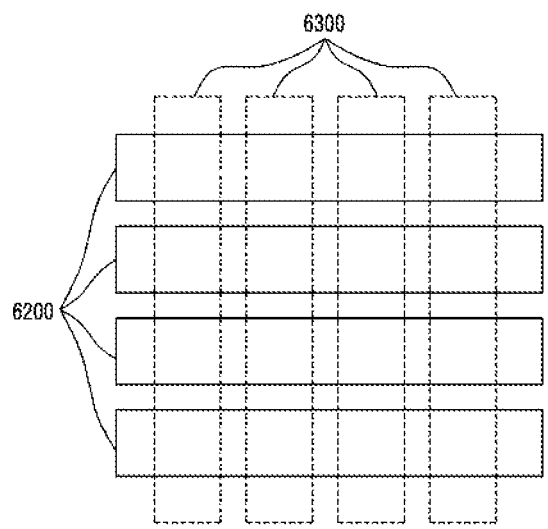
Figure 18C:
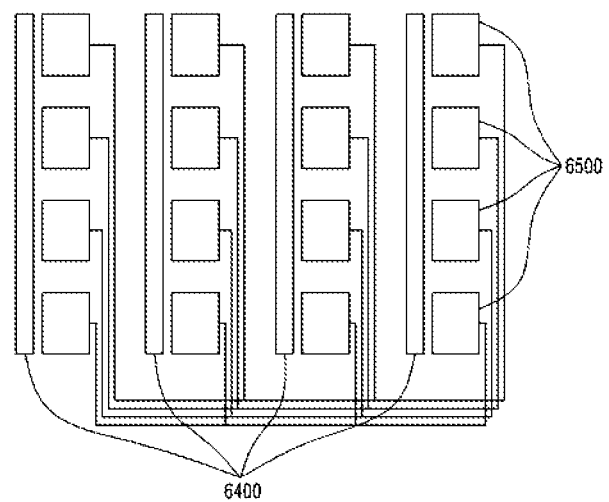

FIGS. 11a to 11d show a structure of the touch position sensing module according to the first embodiment. FIGS. 18a to 18c are structure views showing the shape of an electrode formed in the touch position sensing module according to the embodiment.

Figure 11A:
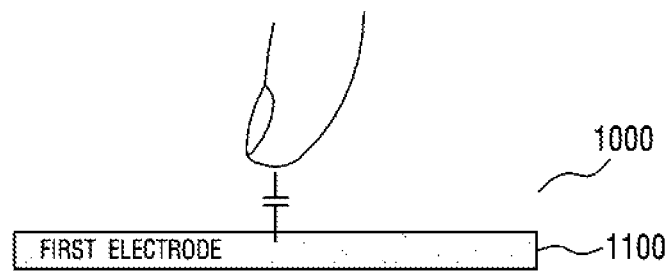
FIGS. 11a to 11d show a structure of a touch position sensing module of the touch screen according to the first embodiment.

As shown in FIG. 11a, the touch position sensing module 1000 according to the embodiment may include a first electrode 1100 formed in one layer. Here, the first electrode 1100 may be, as shown in FIG. 18a, comprised of a plurality of electrodes 6100, and then a driving signal may be input to each electrode 6100 and a sensing signal including information on self-capacitance may be output from each electrode. When an object like a user's finger approaches the first electrode 1100, the finger functions as a ground and the self-capacitance of first electrode 1100 is changed. Therefore, the terminal 100 can detect the touch position by measuring the self-capacitance of the first electrode 1100, which is changed as the object like the user's finger approaches the touch screen 130.

Figure 11B:
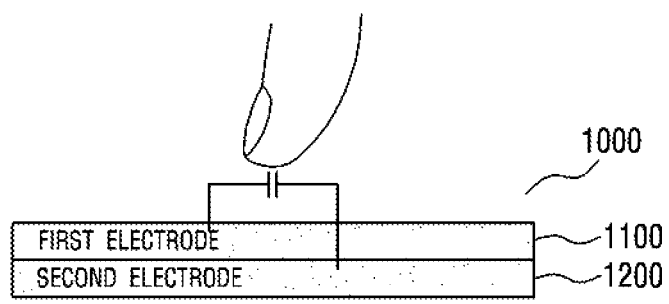

As shown in FIG. 11b, the touch position sensing module 1000 according to the embodiment may include the first electrode 1100 and a second electrode 1200, which are formed on different layers.

Figure 11C:
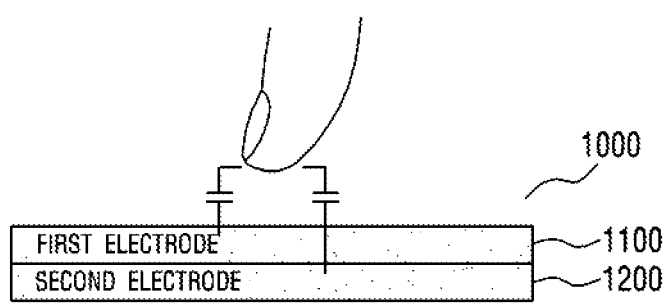

Here, the first and the second electrodes 1100 and 1200 are, as shown in FIG. 18b, comprised of a plurality of first electrodes 6200 and a plurality of second electrodes 6300 respectively. The plurality of first electrodes 6200 and the plurality of second electrodes 6300 may be arranged to cross each other. A driving signal may be input to any one of the first electrode 6200 and the second electrode 6300, and a sensing signal including information on mutual capacitance may be output from the other. As shown in FIG. 11b, when the object like the user's finger approaches the first electrode 1100 and the second electrode 1200, the finger functions as a ground, so that the mutual capacitance between the first electrode 1100 and the second electrode 1200 is changed. In this case, the terminal 100 measures the mutual capacitance between the first electrode 1100 and the second electrode 1200, which is changed with the approach of the object like the user's finger to the touch screen 130, and then detects the touch position. Also, the driving signal may be input to the first electrode 6200 and the second electrode 6300, and a sensing signal including information on the self-capacitance may be output from the first and second electrodes 6200 and 6300 respectively. As shown in FIG. 11c, when the object like the user's finger approaches the first electrode 1100 and the second electrode 1200, the finger functions as a ground, so that the self-capacitance of each of the first and second electrodes 1100 and 1200 is changed. In this case, the terminal 100 measures the self-capacitances of the first electrode 1100 and the second electrode 1200, which is changed with the approach of the object like the user's finger to the touch screen 130, and then detects the touch position.

Figure 11D:
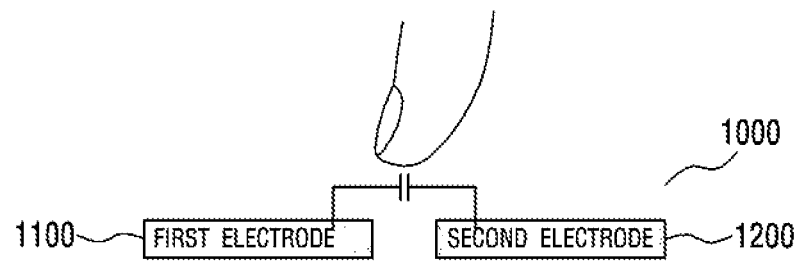

As shown in FIG. 11d, the touch position sensing module 1000 according to the embodiment may include the first electrode 1100 formed in one layer and the second electrode 1200 formed in the same layer as the layer in which the first electrode 1100 has been formed.

Here, the first and the second electrodes 1100 and 1200 are, as shown in FIG. 18c, comprised of a plurality of first electrodes 6400 and a plurality of second electrodes 6500 respectively. The plurality of first electrodes 6400 and the plurality of second electrodes 6500 may be arranged without crossing each other and may be arranged such that the plurality of second electrodes 6500 are connected to each other in a direction crossing the extension direction of the each first electrodes 6400. A principle of detecting the touch position by using the first electrode 6400 or the second electrode 6500 shown in FIG. 11*d* is the same as that of the foregoing referring to FIG. 11*c*, and thus a description of the principle will be omitted.

FIGS. 12*a* to 12*f* show a structure of the touch pressure sensing module according to the first embodiment. FIGS. 18*a* to 18*d* are structure views showing the shape of the electrode formed in the touch pressure sensing module 2000 according to the embodiment.

As shown in FIGS. 12*a* to 12*f*, the touch pressure sensing module 2000 according to the first embodiment may include a spacer layer 2400. The spacer layer 2400 may be implemented by an air gap. The spacer may be comprised of an impact absorbing material according to the embodiment and may be also filled with a dielectric material according to the embodiment.

As shown in FIGS. 12*a* to 12*d*, the touch pressure sensing module 2000 according to the first embodiment may include a reference potential layer 2500. The reference potential layer 2500 may have any potential. For example, the reference potential layer may be a ground layer having a ground potential. Here, the reference potential layer may include a layer which is parallel with a two-dimensional plane in which a below-described first electrode 2100 for sensing the touch pressure has been formed or a two-dimensional plane in which a below-described second electrode 2200 for sensing the touch pressure has been formed. Although it has been described in FIGS. 12*a* to 12*d* that the touch pressure sensing module 2000 includes the reference potential layer 2500, there is no limit to this. The touch pressure sensing module 2000 does not include the reference potential layer 2500, and the display module 3000 or the substrate 4000 which is disposed under the touch pressure sensing module 2000 may function as the reference potential layer.

Figure 12A:
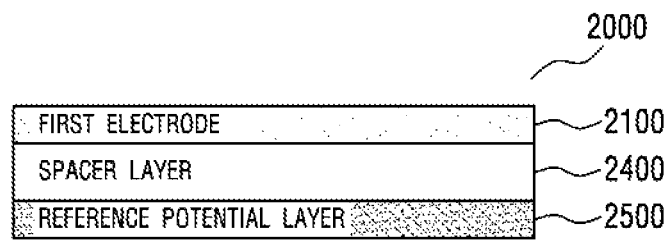
FIGS. 12a to 12f show a structure of a touch pressure sensing module of the touch screen according to the first embodiment.

As shown in FIG. 12*a*, the touch pressure sensing module 2000 according to the embodiment may include the first electrode 2100 formed in one layer, the spacer layer 2400 formed under the layer in which the first electrode 2100 has been formed, and the reference potential layer 2500 formed under the spacer layer 2400.

Figure 12B:
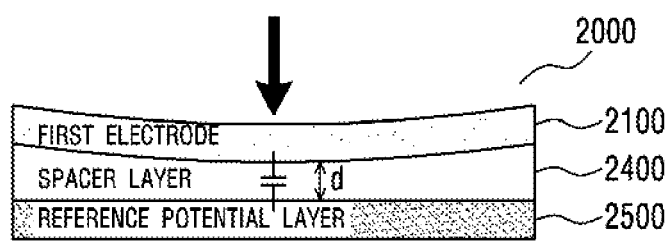
Figure 18D:
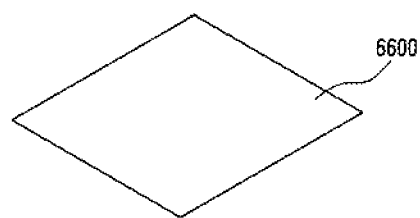

Here, the first electrode 2100 is, as shown in FIG. 18*a*, comprised of the plurality of electrodes 6100. Then, the driving signal may be input to each of the electrodes 6100 and the sensing signal including information on the self-capacitance may be output from the each electrode. When a pressure is applied to the touch screen 130 by the object like the user's finger or stylus, the first electrode 2100 is, as shown in FIG. 12*b*, curved at least at the touch position, so that a distance "d" between the first electrode 2100 and the reference potential layer 2500 is changed, and thus, the self-capacitance of the first electrode 2100 is changed. Accordingly, the terminal 100 can detect the touch pressure by measuring the self-capacitance of the first electrode 2100, which is changed by the pressure that the object like the user's finger or stylus applies to the touch screen 130. As such, since the first electrode 2100 is comprised of the plurality of electrodes 6100, the terminal 100 can detect the pressure of each of multi touches which have been simultaneously input to the touch screen 130. Also, when there is no requirement for detecting the pressure of each of the multi touches, it is only required to detect overall pressure applied to the touch screen 130 irrespective of the touch position. Therefore, the first electrode 2100 of the touch pressure sensing module 2000 may be, as shown in FIG. 18*d*, comprised of one electrode 6600.

Figure 12C:
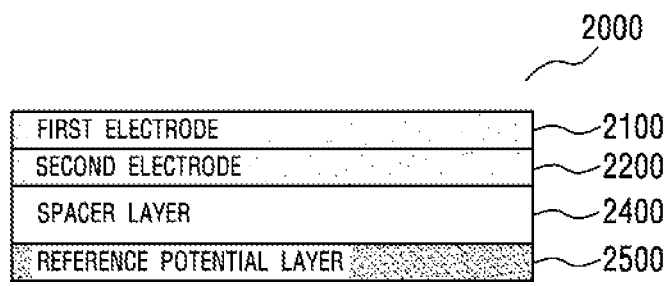

As shown in FIG. 12*c*, the touch pressure sensing module 2000 according to the embodiment may include the first electrode 2100, the second electrode 2200 formed under the layer in which the first electrode 2100 has been formed, the spacer layer 2400 formed under the layer in which the second electrode 2200 has been formed, and the reference potential layer 2500 formed under the spacer layer 2400.

Figure 12D:
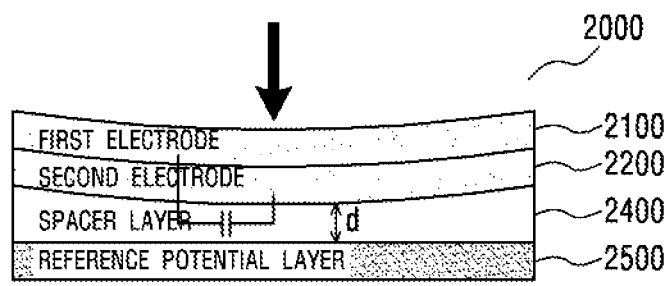

Here, the first electrode 2100 and the second electrode 2200 may be configured and arranged as shown in FIG. 18*b*. A driving signal is input to any one of the first electrode 6200 and the second electrode 6300, and a sensing signal including information on the mutual capacitance may be output from the other. When a pressure is applied to the touch screen 130, the first electrode 2100 and the second electrode 2200 are, as shown in FIG. 12*d*, curved at least at the touch position, so that a distance "d" between the reference potential layer 2500 and both the first electrode 2100 and the second electrode 2200 is changed, and thus, the mutual capacitance between the first electrode 2100 and the second electrode 2200 is changed. Accordingly, the terminal 100 can detect the touch pressure by measuring the mutual capacitance between the first electrode 2100 and the second electrode 2200, which is changed by the pressure that is applied to the touch screen 130. As such, since the first electrode 2100 and the second electrode 2200 are comprised of the plurality of first electrodes 6200 and the plurality of second electrodes 6300 respectively, the terminal 100 can detect the pressure of each of multi touches which have been simultaneously input to the touch screen 130. Also, when there is no requirement for detecting the pressure of each of the multi touches, at least one of the first electrode 2100 and the second electrode 2200 of the touch pressure sensing module 2000 may be, as shown in FIG. 18*d*, comprised of the one electrode 6600.

Here, even when the first electrode 2100 and the second electrode 2200 are formed in the same layer, the touch pressure can be also detected as described in FIG. 12*c*. The first electrode 2100 and the second electrode 2200 may be configured and arranged as shown in FIG. 18*c*, or may be comprised of the one electrode 6600 as shown in FIG. 18*d*.

Figure 12E:
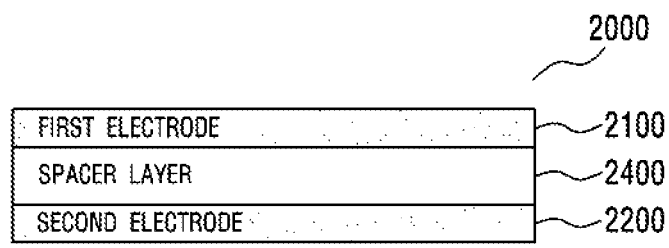

As shown in FIG. 12*e*, the touch pressure sensing module 2000 according to the embodiment may include the first electrode 2100 formed in one layer, the spacer layer 2400 formed under the layer in which the first electrode 2100 has been formed, and the second electrode 2200 formed under the spacer layer 2400.

Figure 12F:
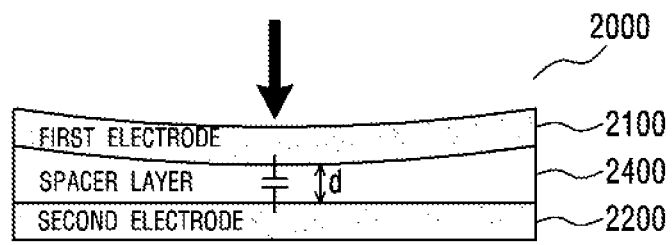

In FIG. 12*e*, the configuration and operation of the first electrode 2100 and the second electrode 2200 are the same as those of the foregoing referring to FIG. 12*c*, and thus, a description of the configuration and operation will be omitted. When a pressure is applied to the touch screen 130, the first electrode 2100 is, as shown in FIG. 12*f*, curved at least at the touch position, so that a distance "d" between the first electrode 2100 and the second electrode 2200 is changed, and thus, the mutual capacitance between the first electrode 2100 and the second electrode 2200 is changed. Accordingly, the terminal 100 can detect the touch pressure by measuring the mutual capacitance between the first electrode 2100 and the second electrode 2200.

Figure 13:
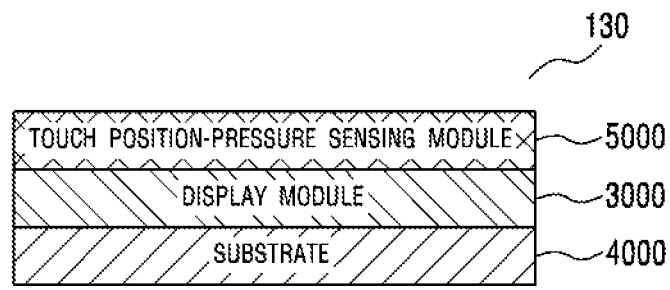
FIG. 13 shows a structure of the touch screen according to the second embodiment.

As shown in FIG. 13, a touch screen 130 according to a second embodiment may include a touch position-pressure sensing module 5000, a display module 3000 disposed under the touch position-pressure sensing module 5000, and a substrate 4000 disposed under the display module 3000.

Unlike the embodiment shown in FIG. 10, the touch position-pressure sensing module 5000 according to the embodiment shown in FIG. 13 includes at least one electrode for sensing the touch position, and at least one electrode for sensing the touch pressure. At least one of the electrodes is used to sense both the touch position and the touch pressure. As such, the electrode for sensing the touch position and the electrode for sensing the touch pressure are shared, so that it is possible to reduce the manufacturing cost of the touch position-pressure sensing module, to reduce the overall thickness of the touch screen 130 and to simplify the manufacturing process. In the sharing of the electrode for sensing the touch position and the electrode for sensing the touch pressure, when it is necessary to distinguish between the sensing signal including information on the touch position and the sensing signal including information on the touch pressure, it is possible to distinguish and sense the touch position and the touch pressure by differentiating a frequency of the driving signal for sensing the touch position from a frequency of the driving signal for sensing the touch pressure, or by differentiating a time interval for sensing the touch position from a time interval for sensing the touch pressure.

FIGS. 14a to 14k show a structure of the touch position-pressure sensing module according to the second embodiment. As shown in FIGS. 14a to 14k, the touch position-pressure sensing module 5000 according to the second embodiment may include a spacer layer 5400.

As shown in FIGS. 14a to 14i, the touch position-pressure sensing module 5000 according to the embodiment may include a reference potential layer 5500. The reference potential layer 5500 is the same as that of the foregoing referring to FIGS. 12a to 12d, and thus, a description of the reference potential layer 5500 will be omitted. The reference potential layer may include a layer which is parallel with a two-dimensional plane in which a below-described first electrode 5100 for sensing the touch pressure has been formed, a two-dimensional plane in which a below-described second electrode 5200 for sensing the touch pressure has been formed, or a two-dimensional plane in which a below-described third electrode 5300 for sensing the touch pressure has been formed.

Figure 14A:
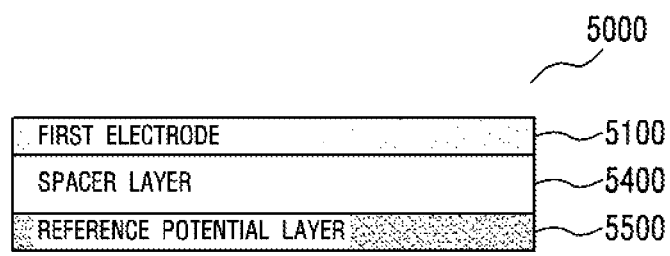
FIGS. 14a to 14k show a structure of a touch position-pressure sensing module of the touch screen according to the second embodiment.

As shown in FIG. 14a, the touch position-pressure sensing module 5000 according to the embodiment may include the first electrode 5100 formed in one layer, the spacer layer 5400 formed under the layer in which the first electrode 5100 has been formed, and the reference potential layer 5500 formed under the spacer layer 5400.

Figure 14B:
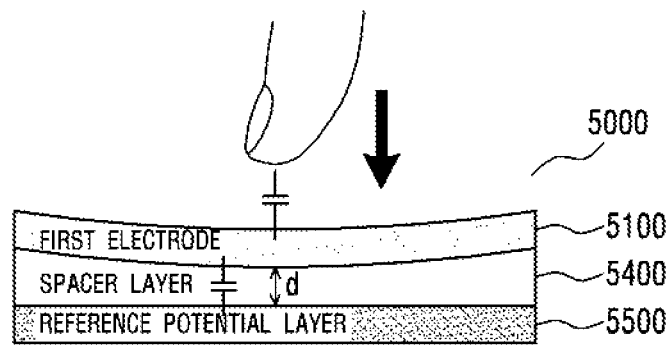

A description of the configuration of FIGS. 14a and 14b is similar to the description referring to FIGS. 12a and 12b. Hereafter, only the difference between them will be described. As shown in FIG. 14b, when the object like the user's finger approaches the first electrode 5100, the finger functions as a ground and the touch position can be detected by the change of the self-capacitance of the first electrode 5100. Also, when a pressure is applied to the touch screen 130 by the object, a distance "d" between the first electrode 5100 and the reference potential layer 5500 is changed, and thus, the touch pressure can be detected by the change of the self-capacitance of the first electrode 5100.

Figure 14C:
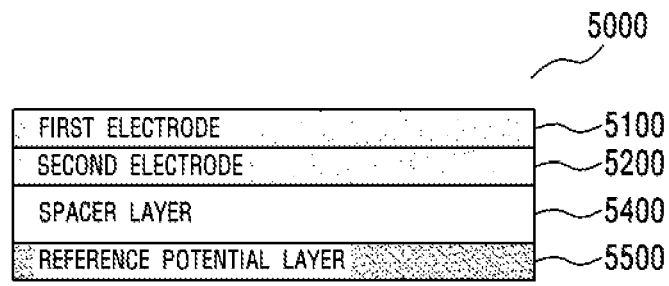

As shown in FIG. 14c, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the reference potential layer 5500 formed under the spacer layer 5400.

Figure 14D:
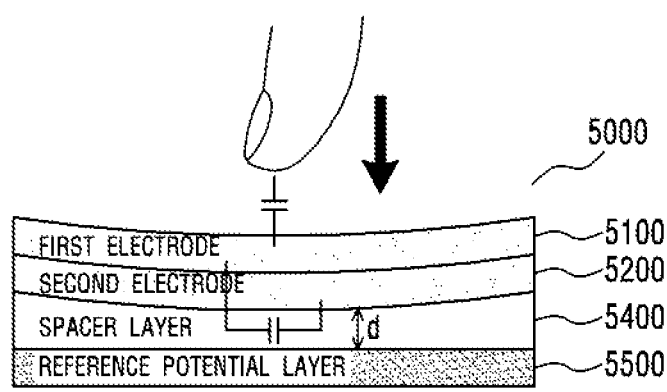

A description of the configuration of FIGS. 14c to 14f is similar to the description referring to FIGS. 12c and 12d. Hereafter, only the difference between them will be described. Here, the first electrode 5100 and the second electrode 5200 may be, as shown in FIG. 18a, comprised of the plurality of electrodes 6100 respectively. As shown in FIG. 14d, when the object like the user's finger approaches the first electrode 5100, the finger functions as a ground and the touch position can be detected by the change of the self-capacitance of the first electrode 5100. Also, when a pressure is applied to the touch screen 130 by the object, a distance "d" between the reference potential layer 5500 and both the first electrode 5100 and the second electrode 5200 is changed, and thus, the touch pressure can be detected by the change of the mutual capacitance between the first electrode 5100 and the second electrode 5200.

Also, according to the embodiment, each of the first and second electrodes 5100 and 5200 may be, as shown in FIG. 18b, comprised of the plurality of first electrodes 6200 and the plurality of second electrodes 6300. The plurality of first electrodes 6200 and the plurality of second electrodes 6300 may be arranged to cross each other. Here, the touch position can be detected by the change of the mutual capacitance between the first electrode 5100 and the second electrode 5200, and the touch pressure can be detected by the change of the self-capacitance of the second electrode 5200 according to the change of a distance "d" between the second electrode 5200 and the reference potential layer 5500. Also, according to the embodiment, the touch position can be detected by the change of the mutual capacitance between the first electrode 5100 and the second electrode 5200, and also, the touch pressure can be detected by the change of the mutual capacitance between the first electrode 5100 and the second electrode 5200 according to the change of the distance "d" between the reference potential layer 5500 and both the first electrode 5100 and the second electrode 5200.

Here, even when the first electrode 5100 and the second electrode 5200 are formed in the same layer, the touch position and touch pressure can be also detected as described with reference to FIGS. 14c and 14d. However, in FIGS. 14c and 14d, regarding the embodiment where the electrode should be configured as shown in FIG. 18b, when the first electrode 5100 and the second electrode 5200 are formed in the same layer, the first electrode 5100 and the second electrode 5200 may be configured as shown in FIG. 18c.

Figure 14E:
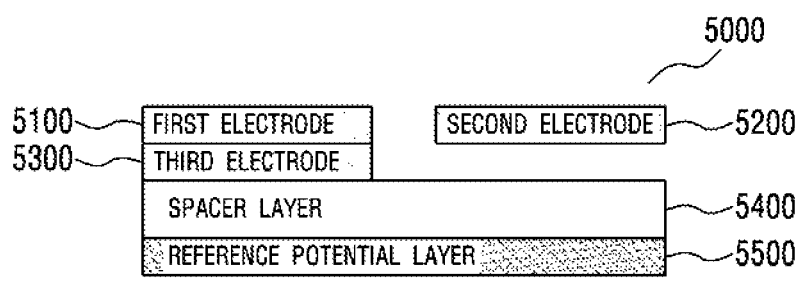

As shown in FIG. 14e, the touch position-pressure sensing module 5000 according to the embodiment may include the first electrode 5100 and the second electrode 5200 which have been in the same layer, the third electrode 5300 which has been formed in a layer under the layer in which the first electrode 5100 and the second electrode 5200 have been formed, the spacer layer 5400 formed under the layer in which the third electrode 5300 has been formed, and the reference potential layer 5500 formed under the spacer layer 5400.

Figure 14F:
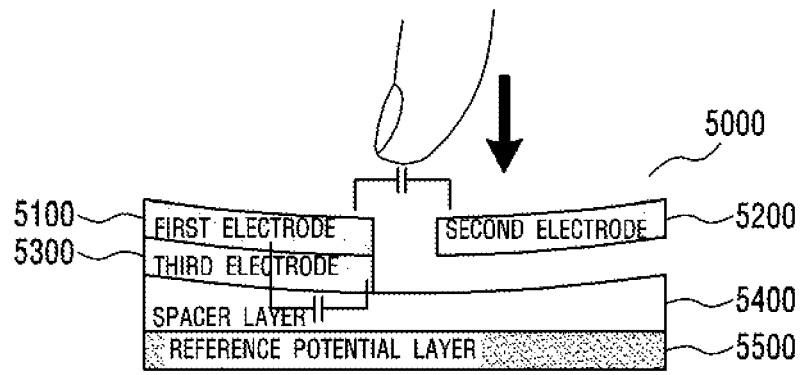

Here, the first electrode 5100 and the second electrode 5200 may be configured and arranged as shown in FIG. 18c, and the first electrode 5100 and the third electrode 5300 may be configured and arranged as shown in FIG. 18b. As shown in FIG. 14f, when the object like the user's finger approaches the first electrode 5100 and the second electrode 5200, the mutual capacitance between the first electrode 5100 and the second electrode 5200 is changed, so that the touch position can be detected. When a pressure is applied to the touch screen 130 by the object, a distance "d" between the reference potential layer 5500 and both the first electrode 5100 and the third electrode 5300 is changed, and then the mutual capacitance between the first electrode 5100 and the third electrode 5300 is hereby changed, so that the touch pressure can be detected. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 14G:
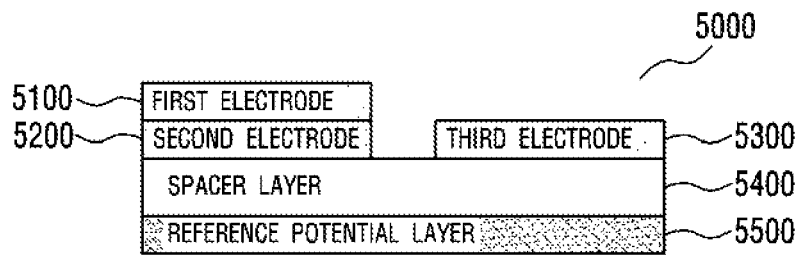

As shown in FIG. 14g, the touch position-pressure sensing module 5000 according to the embodiment may include the first electrode 5100 formed in one layer, the second electrode 5200 formed in a layer under the layer in which the first electrode 5100 has been formed, the third electrode 5300 formed in the same layer as the layer in which the second electrode 5200 has been formed, the spacer layer 5400 formed under the layer in which the second electrode 5200 and the third electrode 5300 have been formed, and the reference potential layer 5500 formed under the spacer layer 5400.

Figure 14H:
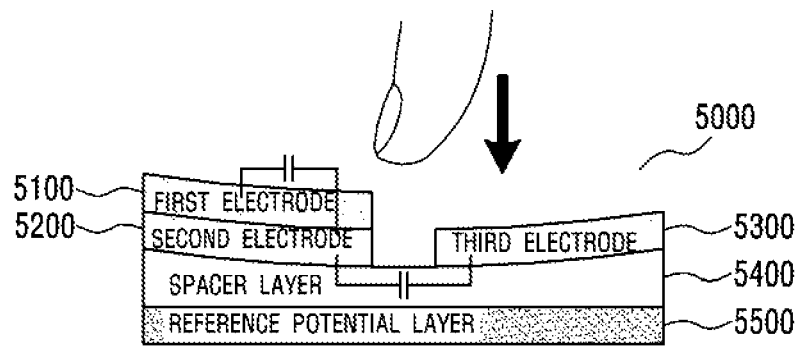

Here, the first electrode 5100 and the second electrode 5200 may be configured and arranged as shown in FIG. 18b, and the second electrode 5200 and the third electrode 5300 may be configured and arranged as shown in FIG. 18c. In FIG. 14h, the touch position can be detected by the change of the mutual capacitance between the first electrode 5100 and the second electrode 5200, and the touch pressure can be detected by the change of the mutual capacitance between the second electrode 5200 and the third electrode 5300. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 14I:
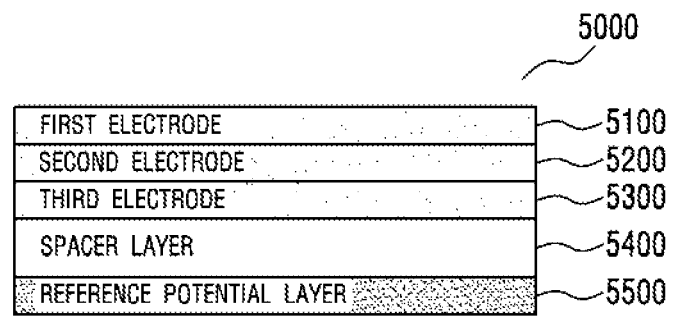

As shown in FIG. 14i, the touch position-pressure sensing module 5000 according to the embodiment may include the first electrode 5100 formed in one layer, the second electrode 5200 formed in a layer under the layer in which the first electrode 5100 has been formed, the third electrode 5300 formed under the layer in which the second electrode 5200 has been formed, the spacer layer 5400 formed under the layer in which the third electrode 5300 has been formed, and the reference potential layer 5500 formed under the spacer layer 5400.

Here, the first electrode 5100 and the second electrode 5200 may be configured and arranged as shown in FIG. 18b, and the second electrode 5200 and the third electrode 5300 may be also configured and arranged as shown in FIG. 18b. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch screen 130 by the object, a distance "d" between the reference potential layer 5500 and both the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 14J:
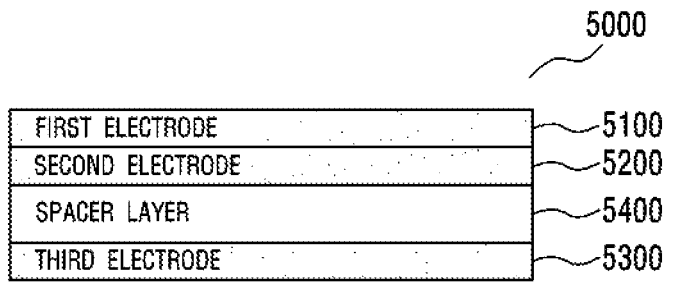

As shown in FIG. 14j, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the third electrode 5300 formed under the spacer layer 5400.

Here, the first electrode 5100 and the second electrode 5200 may be configured and arranged as shown in FIG. 18b, and the third electrode 5300 may be configured as shown in FIG. 18a or the second electrode 5200 and the third electrode 5300 may be also configured and arranged as shown in FIG. 18b. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch screen 130 by the object, a distance "d" between the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 14K:
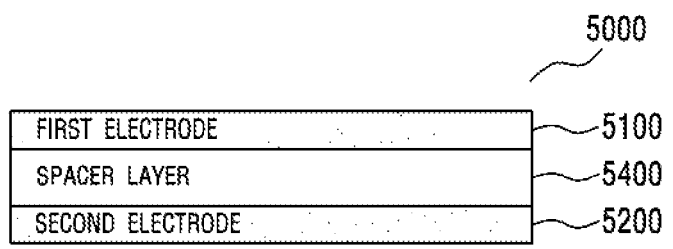

As shown in FIG. 14k, the touch position-pressure sensing module 5000 according to the embodiment may include the first electrode 5100 formed in one layer, the spacer layer 5400 formed under the layer in which the first electrode 5100 has been formed, and the second electrode 5200 formed under the spacer layer 5400.

Here, the first electrode 5100 and the second electrode 5200 may be configured and arranged as shown in FIG. 18b. Here, the touch position can be detected by the change of the mutual capacitance between the first electrode 5100 and the second electrode 5200. Also, when a pressure is applied to the touch screen 130 by the object, a distance "d" between the first electrode 5100 and the second electrode 5200 is changed, so that the touch pressure can be detected by the change of the mutual capacitance between the first electrode 5100 and the second electrode 5200. The first electrode 5100 and the second electrode 5200 may be configured and arranged as shown in FIG. 18a. Here, when the object like the user's finger approaches the first electrode 5100, the finger functions as a ground and the self-capacitance of the first electrode 5100 is changed, so that the touch position can be detected. Also, the touch pressure can be detected by the change of the mutual capacitance between the first electrode 5100 and the second electrode 5200.

Figure 15:
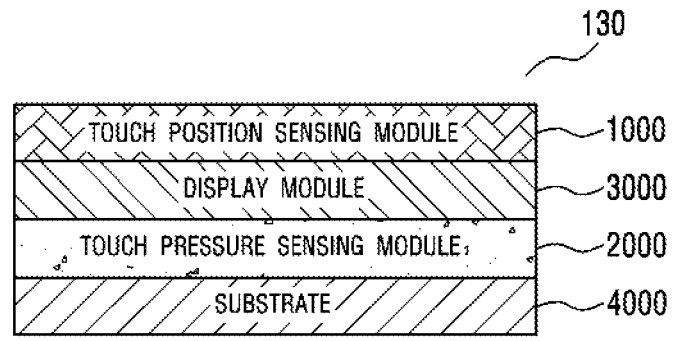
FIG. 15 shows a structure of the touch screen according to the third embodiment.

As shown in FIG. 15, a touch screen 130 according to a third embodiment may include the touch position sensing module 1000, the display module 3000 disposed under the touch position sensing module 1000, the touch pressure sensing module 2000 disposed under the display module 3000, and the substrate 4000 disposed under the touch pressure sensing module 2000.

In the touch screens 130 according to the embodiment shown in FIGS. 10 and 13, since the touch pressure sensing module 2000 which includes the spacer layer 2400 or the touch position-pressure sensing module 5000 which includes the spacer layer 5400 is disposed on the display module 3000, the color clarity, visibility, optical transmittance of the display module 3000 may be reduced. Therefore, in order to prevent such problems, the touch position sensing module 1000 and the display module 3000 are fully laminated by using an adhesive like an optically clear adhesive (OCA), and the touch pressure sensing module 2000 is disposed under the display module 3000. As a result, the aforementioned problem can be alleviated and solved. Also, an existing gap formed between the display module 3000 and the substrate 4000 is used as the spacer layer for detecting the touch pressure, so that the overall thickness of the touch screen 130 can be reduced.

The touch position sensing module 1000 according to the embodiment shown in FIG. 15 is the same as the touch position sensing module shown in FIGS. 11a to 11d.

Figure 16A:
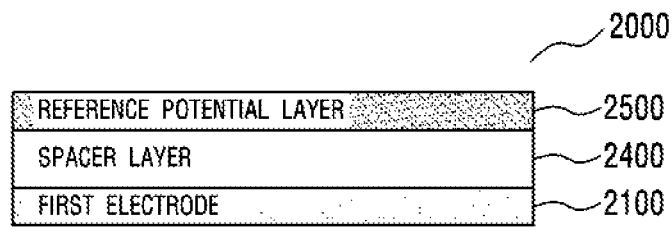
FIGS. 16a to 16b show a structure of a touch pressure sensing module of the touch screen according to the third embodiment.
Figure 16B:
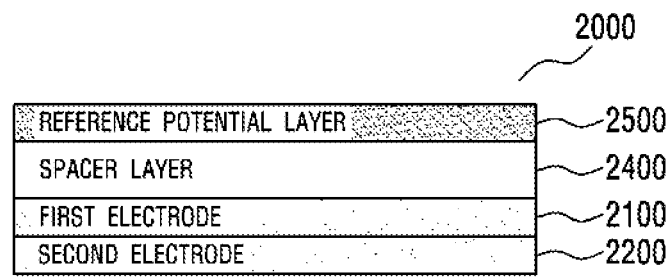

The touch pressure sensing module 2000 according to the embodiment shown in FIG. 15 may be the touch pressure sensing module shown in FIGS. 12a to 12f and the touch pressure sensing module shown in FIGS. 16a to 16b.

As shown in FIG. 16a, the touch pressure sensing module 2000 according to the embodiment may include the reference potential layer 2500, the spacer layer 2400 formed under the reference potential layer 2500, and the first electrode 2100 formed under the spacer layer 2400. Since the configuration and operation of FIG. 16a are the same as those of FIGS. 12a and 12b with the exception of the fact that the position of the reference potential layer 2500 and the position of the first electrode 2100 are replaced with each other, repetitive descriptions thereof will be omitted hereafter.

As shown in FIG. 16b, the touch pressure sensing module 2000 according to the embodiment may include the reference potential layer 2500, the spacer layer 2400 formed under the ground, the first electrode 2100 formed in a layer under the spacer layer 2400, and the second electrode 2200 formed in a layer under the layer in which the first electrode 2100 has been formed. Since the configuration and operation of FIG. 16b are the same as those of FIGS. 12c and 12d with the exception of the fact that the position of the reference potential layer 2500, the position of the first electrode 2100 and the position of the second electrode 2200 are replaced with each other, repetitive descriptions thereof will be omitted hereafter. Here, even when the first electrode 2100 and the second electrode 2200 are formed in the same layer, the touch pressure can be detected as described in FIGS. 12c and 12d.

Although it has been described in FIG. 15 that the display module 3000 is disposed under the touch position sensing module 1000, the touch position sensing module 1000 can be included within the display module 3000. Also, although it has been described in FIG. 15 that the touch pressure sensing module 2000 is disposed under the display module 3000, a portion of the touch pressure sensing module 2000 can be included within the display module 3000. Specifically, the reference potential layer 2500 of the touch pressure sensing module 2000 may be disposed within the display module 3000, and the electrodes 2100 and 2200 may be formed under the display module 3000. As such, when the reference potential layer 2500 is disposed within the display module 3000, a gap formed within the display module 3000 is used as the spacer layer for detecting the touch pressure, so that the overall thickness of the touch screen 130 can be reduced. Here, the electrodes 2100 and 2200 may be formed on the substrate 4000. As such, when the electrodes 2100 and 2200 are formed on the substrate 4000, not only the gap formed within the display module 3000 but also the gap formed between the display module 3000 and the substrate 4000 is used as the spacer layer for detecting the touch pressure, so that the sensitivity for detecting the touch pressure can be more improved.

Figure 17A:
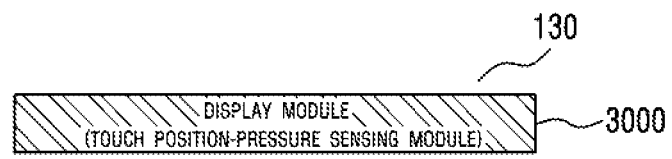
FIG. 17a shows a structure of the touch screen according to a fourth embodiment.

FIG. 17a shows a structure of the touch screen according to a fourth embodiment. As shown in FIG. 17a, the touch screen 130 according to the fourth embodiment may include at least one of the touch position sensing module and the touch pressure sensing module within the display module 3000.

Figure 17B:
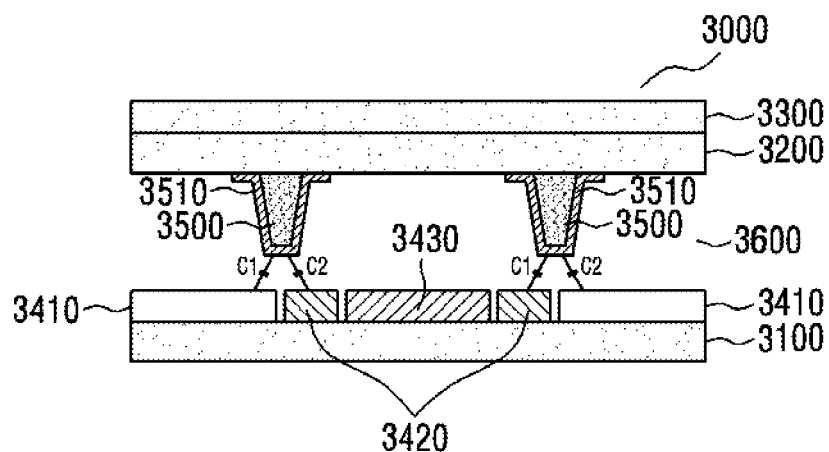
FIGS. 17b and 17c are structure views of touch pressure sensing and touch position sensing of the touch screen according to the fourth embodiment.
Figure 17C:
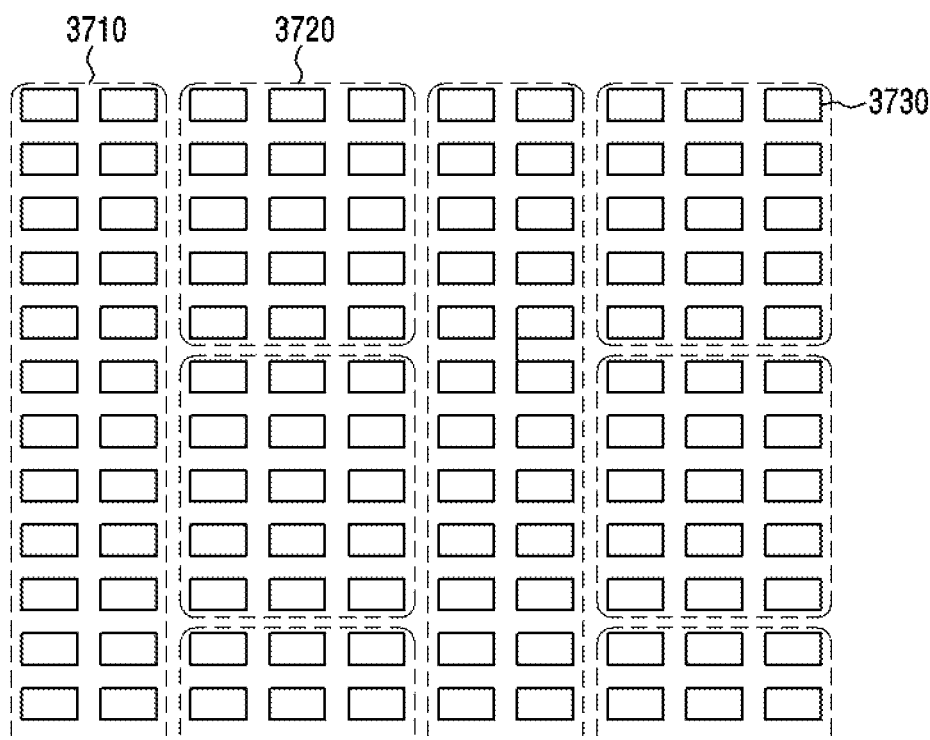

FIGS. 17b and 17c are structure views of touch pressure sensing and touch position sensing of the touch screen according to the fourth embodiment. FIGS. 17b and 17c take an LCD panel as an example of the display module 3000.

In case of the LCD panel, the display module 3000 may include a TFT layer 3100 and a color filter layer 3300. The TFT layer 3100 includes a TFT substrate layer 3110 disposed directly thereon. The color filter layer 3300 includes a color filter substrate layer 3200 disposed directly thereunder. The display module 3000 includes a liquid crystal layer 3600 between the TFT layer 3100 and the color filter layer 3300. Here, the TFT substrate layer 3110 includes electrical components necessary to generate an electric field driving the liquid crystal layer 3600. Particularly, the TFT substrate layer 3110 may be comprised of various layers including a data line, a gate line, TFT, a common electrode, a pixel electrode and the like. These electrical components generate a controlled electric field and orient the liquid crystals in the liquid crystal layer 3600.

As shown in FIG. 17b, the display module 3000 according to the embodiment of the present invention may include sub-photo spacers 3500 disposed on the color filter substrate layer 3200. These sub-photo spacers 3500 may be disposed on the interface between the low common electrode 3410 and the adjacent guard shield electrode 3420. Here, a conductive material layer 3510 like ITO may be patterned on the sub-photo spacer 3500. Here, a fringing capacitance C1 is formed between the low common electrode 3410 and the conductive material layer 3510, and a fringing capacitance C2 is formed between the guard shield electrode 3420 and the conductive material layer 3510.

When the display module 3000 shown in FIG. 17b functions as the touch pressure sensing module, a distance between the sub-photo spacers 3500 and the TFT substrate layer 3110 may be reduced by an external pressure, and thus, a capacitance between the low common electrode 3410 and the guard shield electrode 3420 may be reduced. Accordingly, in FIG. 17b, the conductive material layer 3510 functions as the reference potential layer and detects the change of the capacitance between the low common electrode 3410 and the guard shield electrode 3420, so that the touch pressure can be detected.

FIG. 17c shows a structure in which the LCD panel as the display module 3000 is used as the touch position sensing module. The arrangement of the common electrodes 3730 is shown in FIG. 17c. Here, for the purpose of detecting the touch position, these common electrodes 3730 may be divided into a first area 3710 and a second area 3720. Accordingly, for example, the common electrodes 3730 included in one first area 3710 may be operated in such a manner as to function in response to the first electrode 6400 of FIG. 18c, and the common electrodes 3730 included in one second area 3720 may be operated in such a manner as to function in response to the second electrode 6500 of FIG. 18c. That is, in order that the common electrodes 3730, i.e., electrical components for driving the LCD panel are used to detect the touch position, the common electrodes 3730 may be grouped. Such a grouping can be accomplished by a structural configuration and manipulation of operation.

As described above, in FIG. 17, the electrical components of the display module 3000 are caused to operate in conformity with their original purpose, so that the display module 3000 performs its own function. Also, at least some of the electrical components of the display module 3000 are caused to operate for detecting the touch pressure, so that the display module 3000 functions as the touch pressure sensing module. Also, at least some of the electrical components of the display module 3000 are caused to operate for detecting the touch position, so that the display module 3000 functions as the touch position sensing module. Here, each operation mode may be performed in a time-division manner. In other words, the display module 3000 may function as the display module in a first time interval, as the pressure sensing module in a second time interval, and/or as the position sensing module in a third time interval.

FIGS. 17b and 17c only show the structures for the detection of the touch pressure and the touch position respectively for convenience of description. So long as the display module 3000 can be used to detect the touch pressure and/or the touch position by operating the electrical components for the display operation of the display module 3000, the display module 3000 can be included in the fourth embodiment.

Hereafter, a method for transmitting emotions in accordance with the touch pressure, touch area and touch time period in accordance with the embodiment of the present invention and the terminal for the same will be described with reference to the accompanying drawings.

FIG. 1 is a structure view of the terminal according to the embodiment of the present invention. The terminal 100 according to the embodiment of the present invention may include the touch screen 130 and a processor 140.

The terminal 100 according to the embodiment of the present invention includes the touch screen 130 and is a computing device capable of performing the input to the terminal 100 through the touch on the touch screen 130. The terminal 100 according to the embodiment of the present invention may be a portable electronic device like a laptop computer, a personal digital assistant (PDA), and a smartphone. Also, the terminal 100 according to the embodiment of the present invention may be a non-portable electronic device like a desktop computer and a smart television.

The touch screen 130 according to the embodiment of the present invention allows a sender to operate a computing system by touching the screen with an object like a finger. In general, the touch screen 130 recognizes the touch on the panel and the computing system analyzes the touch and performs operations in accordance with the analysis.

When the touch is input to the touch screen 130, the processor 140 according to the embodiment of the present invention may detect whether the touch occurs on the touch screen 130 or not and the touch position (or coordinates). Also, when the touch is input to the touch screen 130, the processor 140 according to the embodiment of the present invention may measure the capacitance change amount occurring according to the touch.

For example, the size of the mutual capacitance change amount may be changed according to the magnitude of the touch pressure and/or touch area when the touch occurs. Therefore, when the touch is input to the touch screen 130, the processor 140 may measure the size of the capacitance change amount according to the magnitude of the touch pressure and/or touch area. Here, the less the magnitude of the touch pressure is, the less the capacitance change amount may become, and the greater the magnitude of the touch pressure is, the more the capacitance change amount may become. Also, the less the touch area is, the greater the capacitance change amount may become, and the greater the touch area is, the greater the capacitance change amount may become.

Specifically, the processor 140 may measure the capacitance change amount caused by the pressure which is applied from the object 50 to the touch screen 130 through the touch pressure sensing module 2000, the touch position-pressure sensing module 5000 or the display module 3000 of the touch screen 130, which is capable of detecting the touch pressure, and may calculate the magnitude of the touch pressure from the measured capacitance change amount.

Figure 2A:
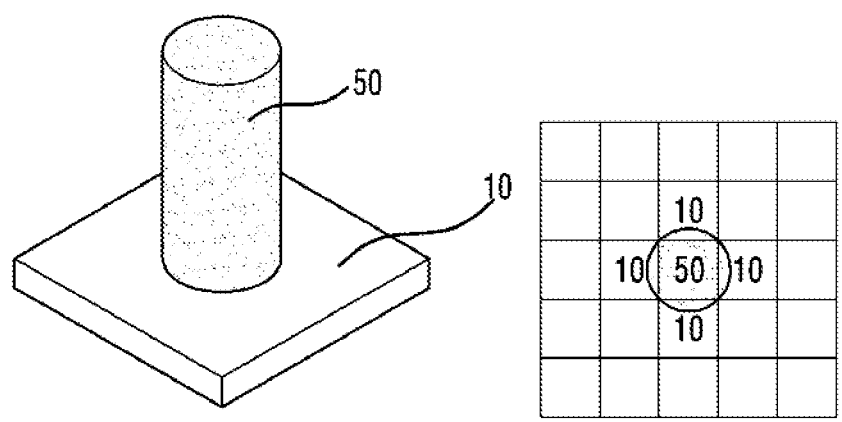
FIGS. 2a and 2b are views for describing a capacitance change amount due to the magnitude of the touch pressure.
Figure 2B:
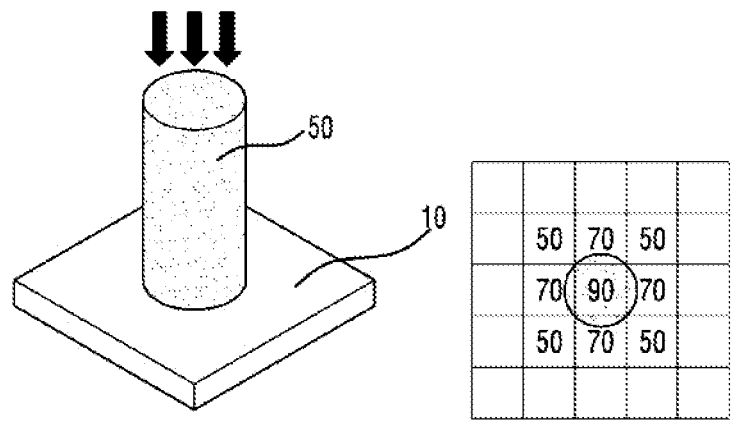

Specifically, the capacitance change amount caused by the object 50 touching the touch screen 130 may be measured by summing the capacitance change amounts of a plurality of sensing cells. For example, as shown in FIG. 2a, when the object 50 touches the touch screen 130 without pressure (simple touch), the sum of the capacitance change amounts is 90 (=50+10+10+10+10). Also, as shown in FIG. 2b, when the object 50 touches the touch screen 130 at a predetermined pressure, the sum of the capacitance change amounts may be 570 (=90+70+70+70+70+50+50+50+50).

Figure 2C:
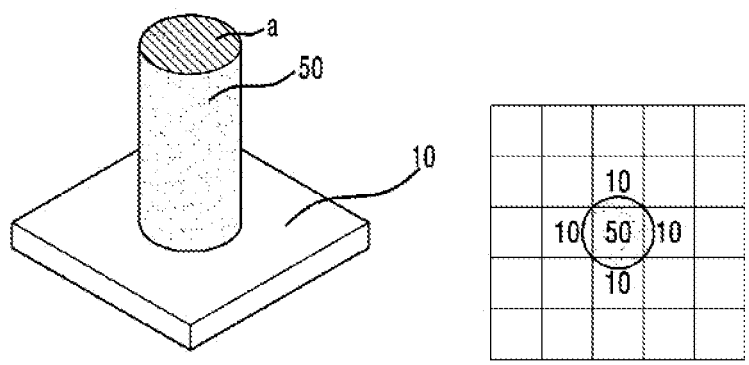
FIGS. 2c and 2d are views for describing the capacitance change amount due to the touch area.
Figure 2D:
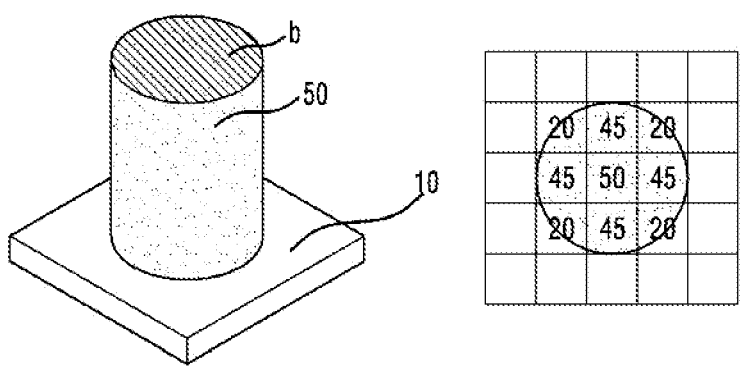

Also, the processor 140 may measure the capacitance change amount caused by the approach of the object 50 to the touch screen 130 through the touch position sensing module 1000, the touch position-pressure sensing module 5000 or the display module 3000 of the touch screen 130, which is capable of detecting the touch position/pressure, and may calculate the touch area from the measured capacitance change amount. For example, as shown in FIG. 2c, when the area of the object 50 touching the touch screen 130 is "a", the sum of the capacitance change amount is 90 (=50+10+10+10+10). Here, as shown in FIG. 2d, when the area of the object 50 touching the touch screen 130 becomes greater from "a" to "b" (b>a), the sum of the capacitance change amounts is increased to 310 (=50+45+45+45+45+20+20+20+20). Here, the magnitude of the pressure which is applied when the object 50 touches the touch screen 130 in both FIGS. 2c and 2d may be 0 or the same.

Particularly, the processor 140 according to the embodiment of the present invention can recognize a hovering state in which the object like the finger does not touch directly the touch screen 130 and is close enough to the touch screen 130 to cause the change of the capacitance in the touch screen 130.

For example, when the object is located within about 2 cm from the surface of the touch screen 130, the processor 140 measures the capacitance change amount according to the approach of the object 50 to the touch screen 130 through the touch position sensing module 1000 or the touch position-pressure sensing module 5000 of the touch screen 130, and then is detect, from the measured capacitance change amount, whether or not the object exists and where the object is located. Here, in order to prevent the meaningless movement of the object from being recognized as the hovering over the touch screen 130, the movement of the object, which satisfies a predetermined condition, can be recognized as the hovering.

For instance, when the object is maintained within a predetermined distance from the touch screen 130 for a time period longer than a predetermined time period from a stationary state, the existence of the object may be recognized as the hovering. Here, the fact that "the object is in the stationary state with respect to the touch screen 130" may mean that the relative two-dimensional movement with respect to the two-dimensional surface of the touch screen 130 is within a predetermined range. Here, the error in the movement may be set variously according to the embodiment. Likewise, a predetermined time period for which the object is in the stationary state may be also set variously according to the embodiment. In order that the movement of the object is recognized as the hovering over the touch screen 130, it is preferable that the capacitance change amount occurring in the touch screen 130 by the hovering is greater than the capacitance error occurring in the common touch screen 130.

The size of the mutual capacitance change amount in the touch screen 130, which is generated during the hovering of the object, may be smaller than that of the capacitance change amount of the direct touch on the touch screen 130. Hereafter, in the method for transmitting emotions in accordance with the magnitude of the touch pressure, touch area and/or touch time period on the touch screen 130, the touch may include the hovering. For instance, the hovering may be classified as having the smallest magnitude of the touch pressure and/or touch area.

Therefore, the processor 140 may detect the capacitance change amount generated at the touch screen 130, and then may determine whether the touch causing the movement of the object to be recognized as the touch or hovering occurs or not and may calculate the touch position, the magnitude of the touch pressure and touch area, and/or may measure the capacitance change amount caused by the touch.

The terminal 100 according to the embodiment of the present invention may further include a controller 110, a memory 120 and a communication module 150.

The controller 110 may calculate the touch time period by using the capacitance change amount transmitted from the processor 140. Specifically, the controller 110 measures a time period during which the capacitance change amount is maintained greater than a predetermined value, thereby calculating a time period during which the object touches the touch screen 130. Here, the predetermined value may be the maximum value of the capacitance change amount caused only by the hovering.

Figure 3A:
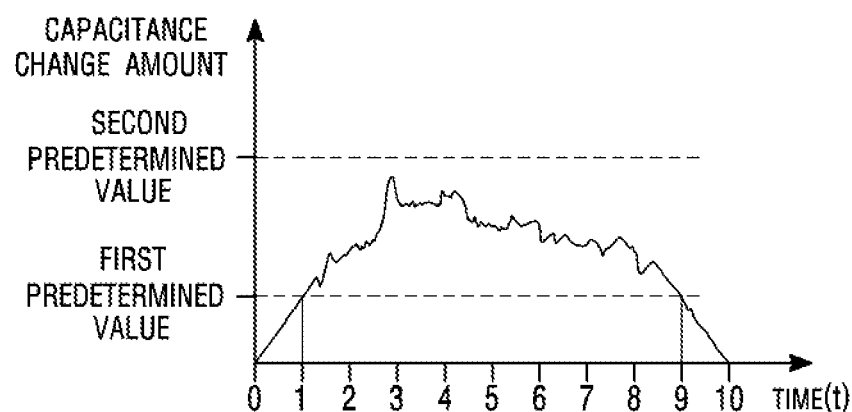
FIGS. 3a and 3b are views for describing a touch time period.
Figure 3B:
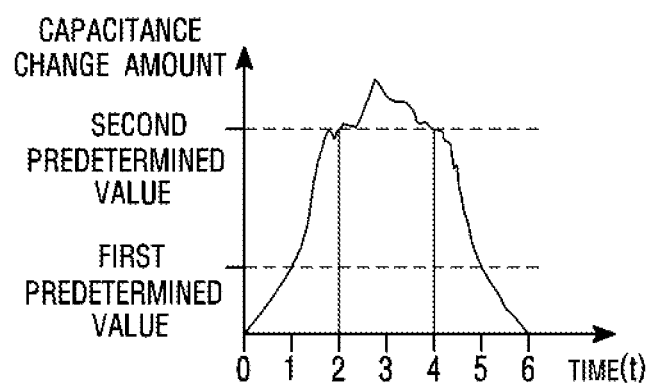

For example, when the predetermined value is 20, a time period during which the capacitance change amount is maintained greater than 20 is, as shown in FIG. 3*a*, 8t. Therefore, the touch period time is 8t. Also, a time period during which the capacitance change amount is maintained greater than 20 is, as shown in FIG. 3*b*, 4t. Therefore, the touch period time is 4t.

The controller 110 may determine a level of the touch on the touch screen 130 in accordance with the capacitance change amount transmitted from the processor 140. Specifically, the controller 110 may determine a stepwise touch level and/or non-stepwise touch level in accordance with at least one of the magnitude of the touch pressure, touch area, touch time period.

First, the stepwise touch level will be described. The controller 110 may calculate the stepwise touch level in accordance with the size range of the capacitance change amount according to the magnitude of the touch pressure and/or touch area. For example, when it is assumed that the capacitance change amount has a value from 0 to 600, the touch level may be calculated as a first level for the capacitance change amount in a range with the smallest value from greater 0 to 150, the touch level may be calculated as a second level for the capacitance change amount in a range with the next largest value from greater 150 to 300, the touch level may be calculated as a third level for the capacitance change amount in a range with the next largest value from greater 300 to 450, and the touch level may be calculated as a fourth level for the capacitance change amount in a range with the largest value from greater 450 to 600. According to the embodiment, the first level may represent the touch pressure magnitude or the touch area according to the hovering. Here, the stepwise distinction of the touch pressure magnitude or the touch area may be changed according to the embodiment. For example, the touch pressure magnitude or the touch area may distinguish between only the hovering and the direct touch, or may distinguish among various levels including the hovering. Such a correlation between the capacitance change amount and the touch level may be stored in the level table.

This is just an example. The touch pressure magnitude and/or the touch area may be set to have a continuous value in such a manner as to be proportional to the capacitance change amount.

Therefore, for example, since the capacitance change amount of the object 50 which is shown in FIG. 2*c* and has touched the touch screen 130 is 90, the touch level may be calculated as the first level. Since the capacitance change amount of the object 50 which is shown in FIG. 2*d* and has touched the touch screen 130 is 310, the touch level may be calculated as the third level.

Here, the first level may be a hovering level in accordance with the embodiment. Here, the configuration of the level according to the magnitude of the touch pressure and/or touch area may be changed depending on the embodiment. For example, the level may be composed of only the hovering and direct touch, or the level may include the hovering and various levels.

Also, the controller 110 may determine the touch level on the touch on the touch screen 130 by using the touch time period calculated based on the capacitance change amount. Specifically, when it is assumed that the touch time period has a value from 0t to 12t, the touch level may be calculated as a first level for the touch time period in a range with a value from greater 0t to 3t, the touch level may be calculated as a second level for the touch time period in a range with the next largest value from greater 3t to 6t, the touch level may be calculated as a third level for the touch time period in a range with the next largest value from greater 6t to 9t, and the touch level may be calculated as a fourth level for the touch time period in a range with the largest value from greater 9t to 12t.

Therefore, the touch level may be calculated as the third level for the touch time period "8t" shown in FIG. 3*a*, and the touch level may be calculated as the second level for the touch time period "4t" shown in FIG. 3*b*.

The correlation between the touch level and at least one of the magnitude of the touch pressure, touch area, and touch time period may be stored in the memory 120.

The non-stepwise touch level will be also described. The controller 110 may calculate the non-stepwise touch level in accordance with the capacitance change amount according to the magnitude of the touch pressure and/or touch area. For instance, the non-stepwise touch level may have the size of the capacitance change amount as it is or the value of the touch time period as it is or may have a normalized value of a predetermined maximum value.

The controller 110 is able to detect whether the touch on the touch screen 130 is a single touch or multiple touches.

Here, the single touch means that the object 50 has touched the touch screen 130 one time within a predetermined time. The multiple touches mean that the object 50 has touched the touch screen 130 at least twice within a predetermined time. Specifically, the multiple touches may include a first touch and a second touch. Here, the magnitude of the touch pressure or the touch area of the first touch may be smaller than the magnitude of the touch pressure or the touch area of the second touch, or both the magnitude of the touch pressure and the touch area of the first touch may be smaller. A time period for the object 50 to release the touch on the touch sensor panel 111 may be included between the first touch and the second touch.

Also, the controller 110 may transmit a message to the terminal of a receiver through the below-described communication module 150. Here, the controller 110 may also control the display driver to display the message through the touch screen 130 of the terminal 100 of the sender.

The communication module 150 according to the embodiment of the present invention may transmit and receive the message to and from the terminal of the receiver. For example, the communication module 150 may make it possible to access the Internet or to transmit and receive data to and from the terminal of the receiver through a mobile communication network (the second, third or later generation mobile communication network). Also, the communication module 150 may make it possible to access the Internet or to transmit and receive data to and from the terminal of the receiver through a short-range communication network including Wi-Fi, Bluetooth, and the like. The communication module 150 may include any communication module to transmit and receive data to and from the terminal of the receiver or to access the Internet.

Figure 4A:
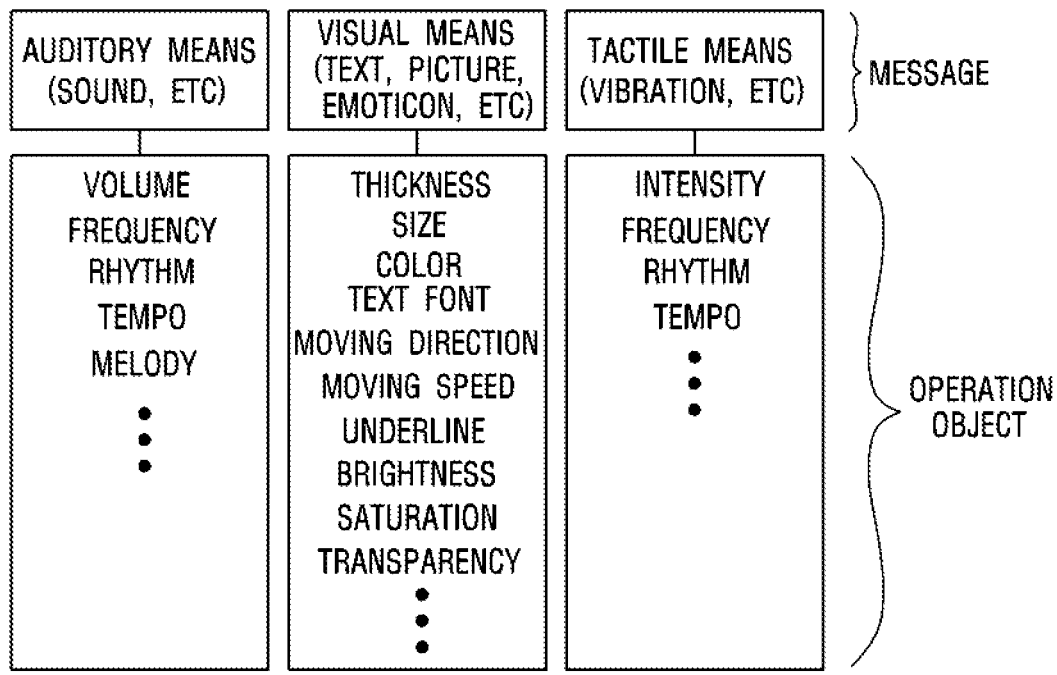
FIG. 4a shows examples of a message according to the embodiment.

FIG. 4a shows examples of the message according to the embodiment.

Referring to FIGS. 1 and 4a, the message according to the embodiment generally includes a visual message, an auditory message and a tactile message. The message may be any means capable of transmitting the intention, emotion, etc., of the sender to the terminal of the receiver by using the terminal 100.

The transmission of the message to the terminal of the receiver through the communication module 150 according to the embodiment of the present invention may include the upload of the message on the Internet web as well as the transmission of the message to the terminal 100 and at least another one terminal 100.

The visual message may include a text, photograph, picture, emoticon, etc. Here, the text may be in the form of a combination of symbols like characters, numbers, and any sign. The text also has various lengths like a word, sentence and paragraph, etc.

The characteristic of the visual message may include thickness, size, color, font, moving direction, moving speed, the existence of an underline, brightness, saturation, transparency, etc.

Specifically, changing the characteristic of the visual message may include increasing or decreasing the thickness, increasing or decreasing the size, changing the color, changing the font, changing the moving direction, increasing or decreasing the moving speed, adding or removing the underline, the lightening or darkening the message, making the message's color deep or pale, and making the message transparent or opaque.

Here, the characteristics of the font, color, existence of the underline, moving direction, etc., may be changed according to the stepwise touch level, and the characteristics of the thickness, size, moving speed, brightness, saturation, transparency, etc., may be changed according to the stepwise touch level or non-stepwise touch level.

The auditory message may include a message such as sound which can be output through a speaker. The characteristic of the auditory message may include volume, frequency (pitch), tempo, rhythm, melody, etc.

Specifically, changing the characteristic of the auditory message may include increasing or decreasing the volume, increasing or decreasing the frequency (pitch), making the tempo faster or slower, changing the rhythm, and changing the melody.

Here, the characteristics of the rhythm and melody, etc., may be changed according to the stepwise touch level, and the characteristics of the volume, frequency, and tempo, etc., may be changed according to the stepwise touch level or non-stepwise touch level.

The tactile message may include a message which can be output by a vibration means like vibration. The characteristic of the tactile message may include intensity, frequency, tempo and rhythm, etc.

Specifically, changing the characteristic of the tactile message may include increasing or decreasing the intensity, increasing or decreasing the frequency, making the tempo faster or slower, changing the rhythm.

Here, the characteristics of the rhythm, etc., may be changed according to the stepwise touch level, and the characteristics of the volume, frequency, and tempo, etc., may be changed according to the stepwise touch level or non-stepwise touch level.

The information on the message characteristic which corresponds to the stepwise touch level and/or non-stepwise touch level of the touch input to the touch screen 130 may be stored in the memory 120. Here, the controller 110 receives the information on the message characteristic which corresponds to the touch level from the memory 120, and changes the characteristic of the message. Then, the message with the changed characteristic may be transmitted to the terminal of the receiver through the below-described communication module 150.

Figure 4B:
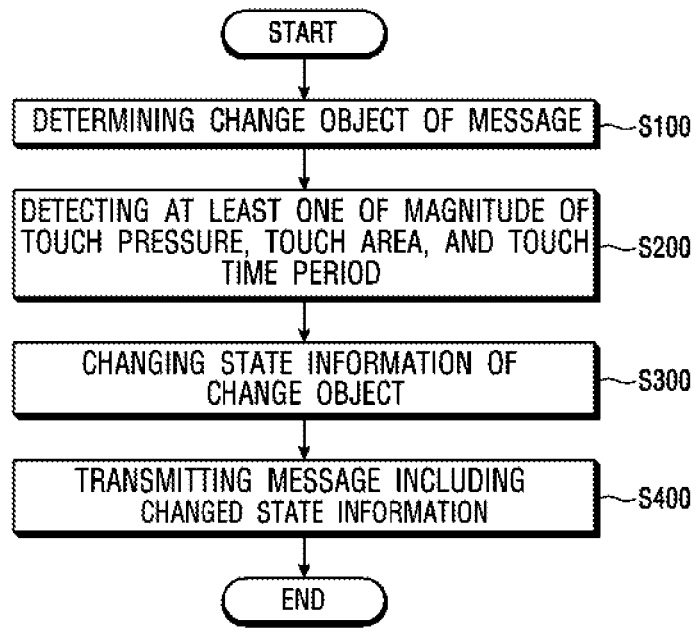
FIG. 4b is a flowchart of a method for transmitting emotion in accordance with the embodiment of the present invention.

FIG. 4b is a flowchart of a method for transmitting emotion in accordance with the embodiment of the present invention.

Referring to FIG. 4b, the emotion transmission method according to the embodiment of the present invention includes determining a change object of the message (S100), detecting at least one of the magnitude of the touch pressure, touch area, and touch time period of the touch input to the touch screen of the terminal of the sender (S200), changing the characteristic of the message in accordance with at least one of the detected magnitude of the touch pressure, touch area, and touch time period (S300), and transmitting the message with the changed characteristic to the terminal of the receiver (S400).

Figure 5A:
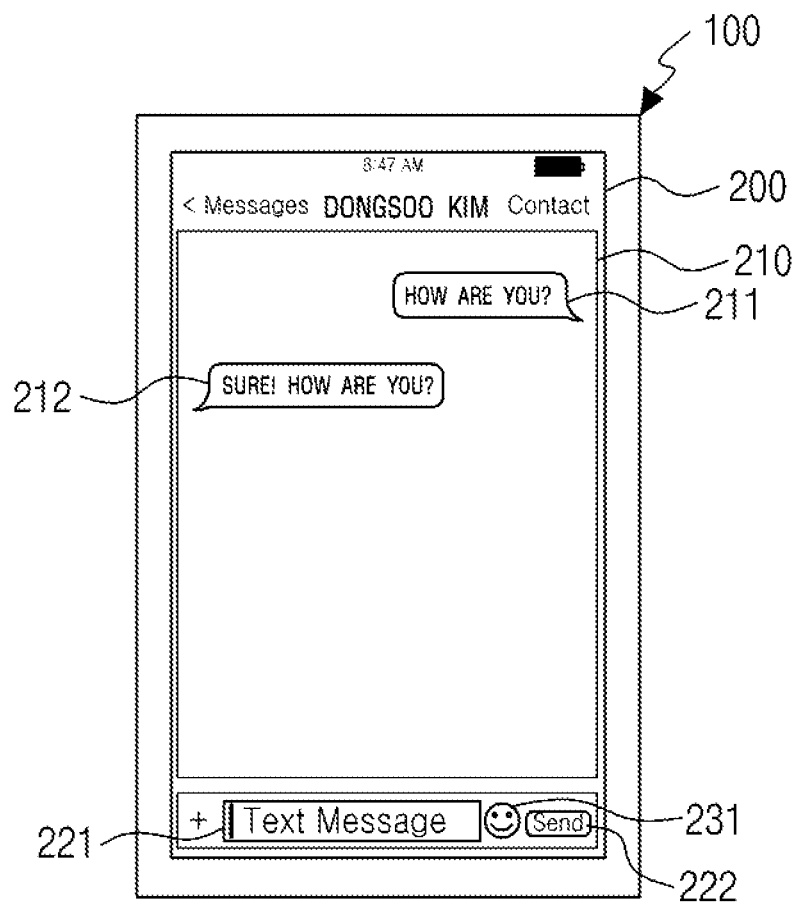
FIGS. 5a to 5c describe determining the characteristic of the message in the emotion transmission method according to the embodiment.
Figure 5B:
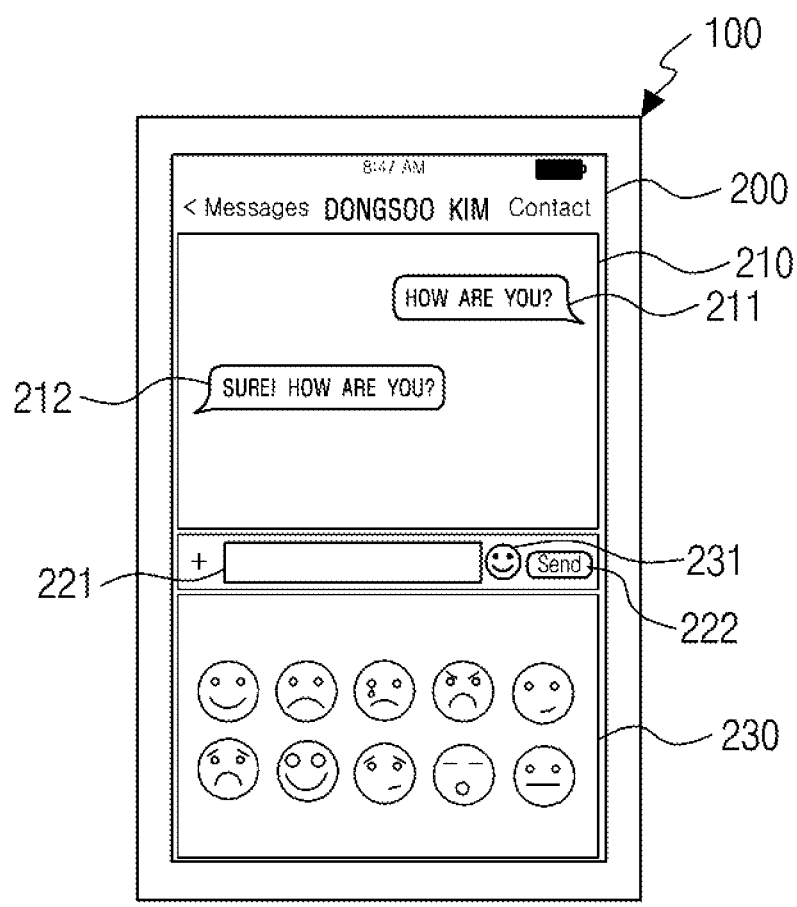
Figure 5C:
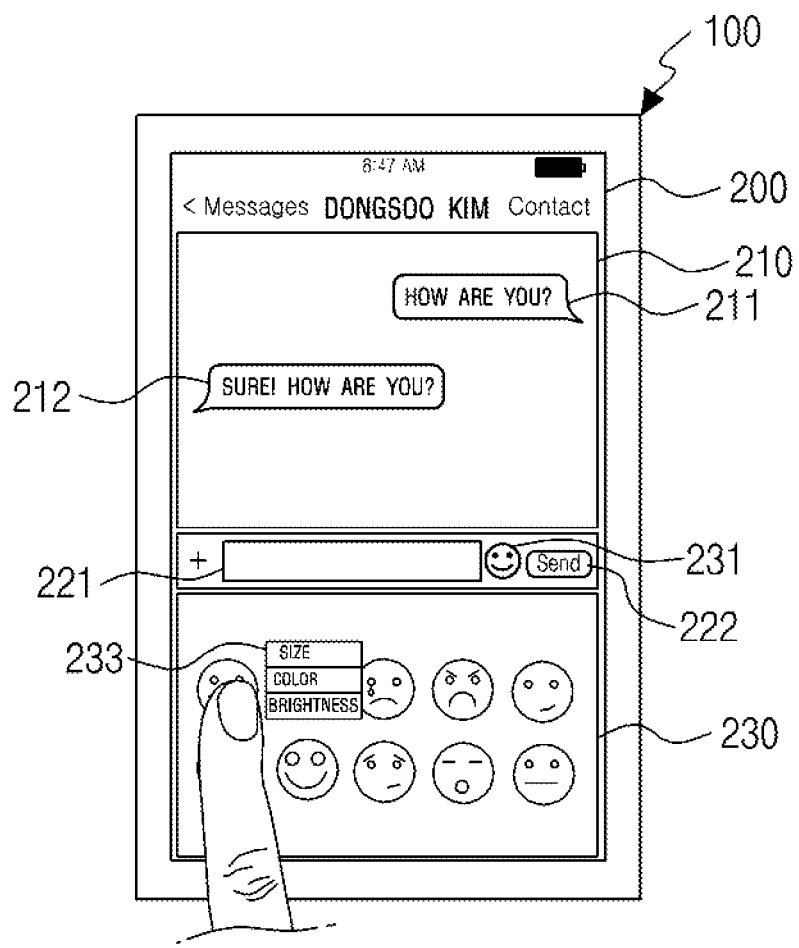

FIGS. 5a to 5c describe the determining the change object of the message (S100) in the emotion transmission method according to the embodiment.

Referring to FIG. 5a, a message window 200 may be displayed on the touch screen 130 of the terminal 100. The displaying on the touch screen 130 may be performed by the display driver.

The message window 200 may be embedded as a program module within the terminal 100 or may be downloaded on the web and displayed on the touch screen 130 by executing an application on the terminal 100.

In the embodiment of the present invention, the message window 200 may be a real-time or non real-time dialogue window such as a message or a messenger between the terminal 100 and at least another one terminal.

Hereafter, while the dialogue window between the terminals 100 is taken as an example of the message window 200, it will be apparent to those skilled in the art that this is just an example.

The message window 200 according to the embodiment of the present invention may include a message input window 221 to which a message to be transmitted to the terminal of the receiver is input and may include an emoticon key 231 for inputting an emoticon to the message input window 221. Also, the message window 200 may include a dialogue window 210 in which the history of dialogue with the terminal of the receiver has been recorded. The message 211 written by the sender and the message 212 written by the receiver are recorded in the dialogue window 210 in time series.

Referring to FIG. 5b, in the emotion transmission method according to the first embodiment of the present invention, the emoticon key 231 of the message window 200 is touched, and thus, a corresponding emoticon area 230 may be displayed.

In the sender's determination of the change object of the message (S100), the change object may be determined as a default change object previously set in the message.

For example, in a state where the change object of a particular emoticon is set as a size by the sender or by an initial setting of the terminal, when the particular emoticon is touched, the change object may be determined as the size.

The emotion transmission method according to the embodiment of the present invention may further include determining the characteristic to be changed of the message in the determining the change object of the message (S100).

The characteristic to be changed of the message in the determining the characteristic of the message may be determined by a predetermined touch type. Specifically, when a single touch is input, the characteristic to be changed of the message is determined as first characteristic, and when multiple touches are input, the characteristic to be changed of the message is determined as a second characteristic different from the first characteristic. For example, when the single touch is input to the particular emoticon by the sender or by the initial setting of the terminal, the characteristic to be changed of the message is set as a size, and when the multiple touches are input, the characteristic to be changed of the message is set as a color. In this case, when the single touch is input to the particular emoticon, the characteristic to be changed of the message may be determined as the size, and when the multiple touches are input to the particular emoticon, the characteristic to be changed of the message may be determined as the color.

The determining the characteristic of the message may include selecting separately the characteristic to be changed among a plurality of the characteristics.

For instance, referring to FIG. 5c, the sender touches the emoticon in the emoticon area 230 and then a characteristic selection mode 233 including the plurality of characteristics is displayed on the touch screen. Then, one of the plurality of characteristics is selected and the characteristic to be changed of the message may be determined as the selected characteristic. Therefore, when the sender intends to change the size of the message, the sender touches an area where the size in the characteristic selection mode 233 has been displayed, and then can determine the characteristic to be changed of the message as the size. Here, the characteristic which is displayed on the characteristic selection mode 233 may be changed according to sender's separate setting.

When the touch occurs on the touch screen 130 of the terminal of the sender, at least of the magnitude of the touch pressure, touch area, and touch time period are detected (S200). Specifically, when the touch is input, the controller 110 may determine the stepwise touch level and/or non-stepwise touch level in accordance with at least one of the magnitude of the touch pressure, touch area, and touch time period.

Figure 6A:
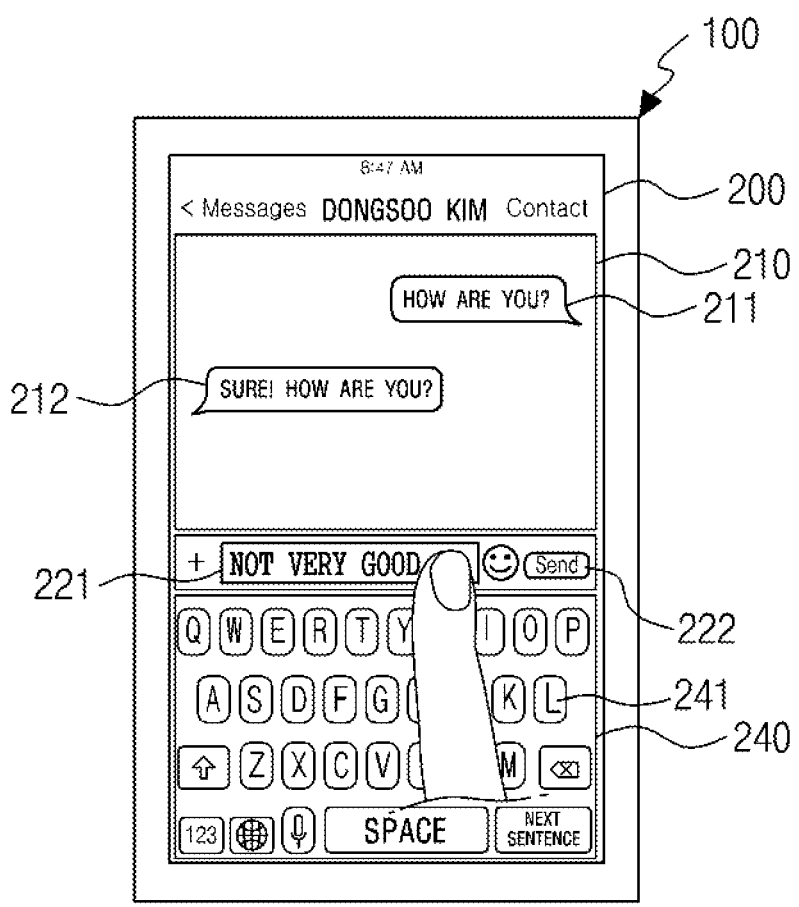
FIGS. 6a and 6b describe changing the state information of the characteristic in accordance with a first embodiment in the emotion transmission method according to the embodiment.
Figure 6B:
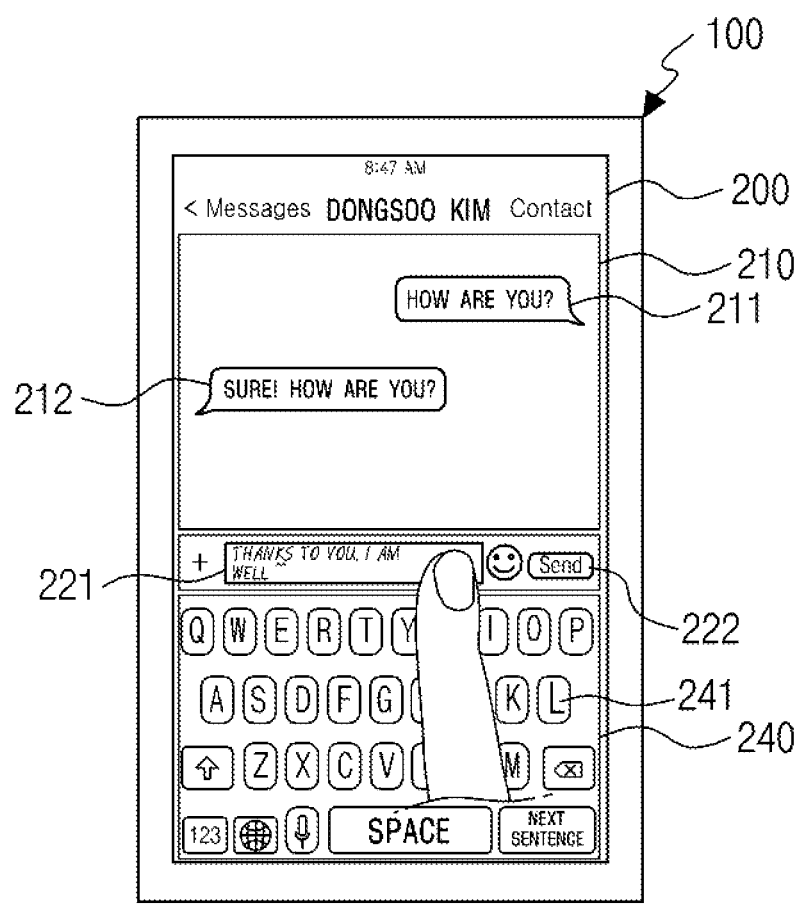

FIGS. 1, 6a and 6b describe changing the characteristic of the message in accordance with the first embodiment (S300) in the emotion transmission method according to the embodiment.

The characteristic to be changed of the message may be determined as a basic characteristic previously set in the message. For example, the characteristic to be changed of the text may be set as a font by the sender or by the initial setting of the terminal.

Specifically, when the message consists of the text and the characteristic is the font, the changing the characteristic of the message will be described below.

Referring to FIGS. 6a and 6b, when the message input window 221 on which the text has been displayed is touched, the font of the text can be changed by using at least one of the magnitude of the touch pressure, touch area, and touch time period.

Specifically, when the first level is set as a first font, the second level is set as a second font, the third level is set as a third font and the fourth level is set as a fourth font, an example in which the characteristic of the message is changed by using the magnitude of the touch pressure will be described.

As shown in FIG. 6a, when the magnitude of the pressure of the input touch is the first level, the font of the text to be transmitted may be changed into the first font. Also, as shown in FIG. 6b, when the magnitude of the pressure of the input touch is the second level, the font of the text to be transmitted may be changed into the second font. Here, the message with the changed font may be displayed on the message input window 221. The sender checks the same feedback as the changed characteristic, thereby checking what font the sender himself/herself has selected.

Here, since the change of the font is determined by the stepwise touch level, the font may be changed into preset various fonts in accordance with the touch level.

As such, the sender may transmit a serious emotion by changing the font of the text to be transmitted into the first font or may transmit a mischievous emotion by changing the font of the text to be transmitted into the second font.

Here, when the sender intends to change the stepwise touch level according to the magnitude of the touch pressure and/or touch area, the sender changes the magnitude of the touch pressure and/or touch area before finally selecting his/her desired stepwise touch level, thereby selecting his/her desired stepwise touch level. For example, while the sender touches the message input window 221 with his/her finger, the sender controls the magnitude of the touch pressure and/or touch area to his/her desired magnitude of the touch pressure and/or touch area, and then releases the finger from the touch screen.

Here, when the finger stays at a position which causes the movement of the finger to be recognized as the hovering over the touch screen, the controller 110 may recognize as if the sender is checking the magnitude of the touch pressure and/or touch area. Therefore, the sender presses the message input window 221 with his/her desired magnitude of the touch pressure and/or touch area, and then may move the finger out of the position which causes the movement of the finger to be recognized as the hovering over the touch screen.

For example, when the desired touch level is the second level, the sender checks that the touch level of the touch input to the message input window 221 is the second level, and then releases the touched finger from the message input window 221. As a result, the selection of the second level is made.

Here, the touch level passes through the first level from the second level during the release of the finger, and there is no magnitude of the touch pressure and/or no touch area. Here, when the touch level stays in each touch level for a period of time shorter than a predetermined period of time, the controller 110 is set such that the corresponding touch level is not selected, so that it is possible to prevent an error of selecting an incorrect touch level at the time of releasing the finger.

Also, in a case where the user intends to change the touch level according to the touch time period, when the touch level does not reach the desired level, the user maintains the touch until the touch time period reaches the desired touch time period, thereby selecting the desired touch level. However, when the touch level passes through the desired touch level, the user cannot select the desired touch level by decreasing the touch level.

In this case, by maintaining the touch for a time period longer than a predetermined maximum touch time period, the touch level is reset and the low touch level is selected. As a result, the desired touch level can be selected.

Specifically, when the touch time period of the message input window 221 exceeds the four touch level, the touch level starts again from the first level. Here, it is displayed again that the touch level is the first level. Then, as the touch time period increases, the touch level may be displayed in the order of the second level, the third level and the fourth level.

Also, unlike the foregoing, when the touch time period of the message input window 221 exceeds the four touch level, the touch level decreases to the third level. Here, the touch level may be displayed as the third level again. Then, as the touch time period increases, the level may be displayed such that the level decreases to the second level and the first level in reverse order and then increases in the order of the second level and the third level when the touch level reaches the first level.

Figure 7A:
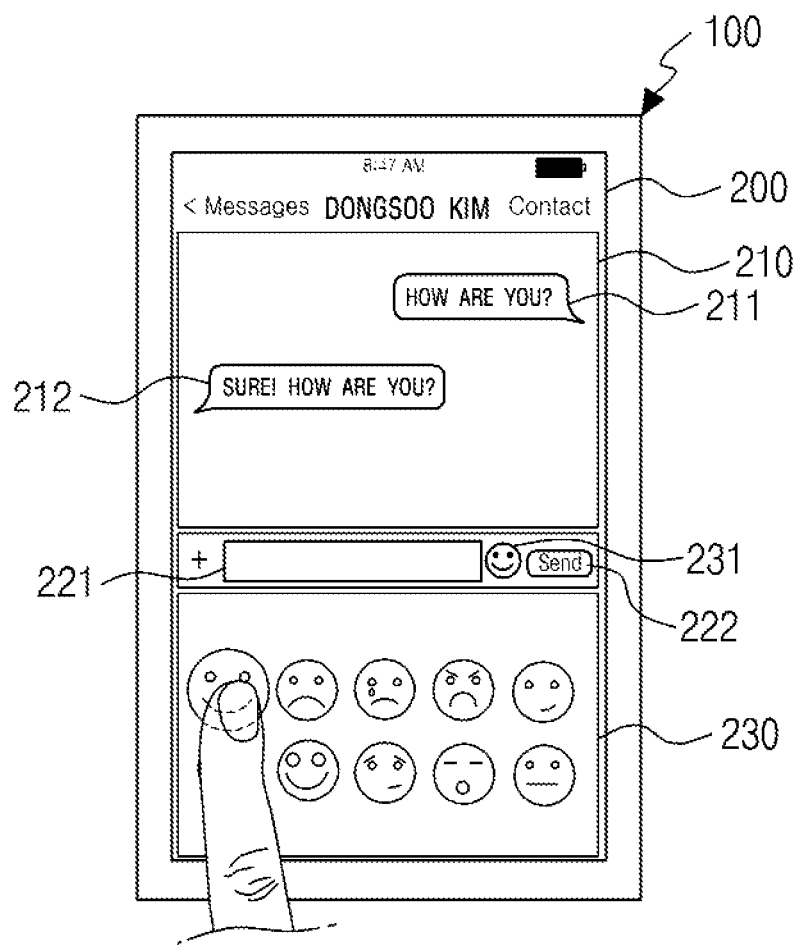
FIGS. 7a and 7c describe changing the state information of the characteristic in accordance with a second embodiment in the emotion transmission method according to the embodiment.
Figure 7B:
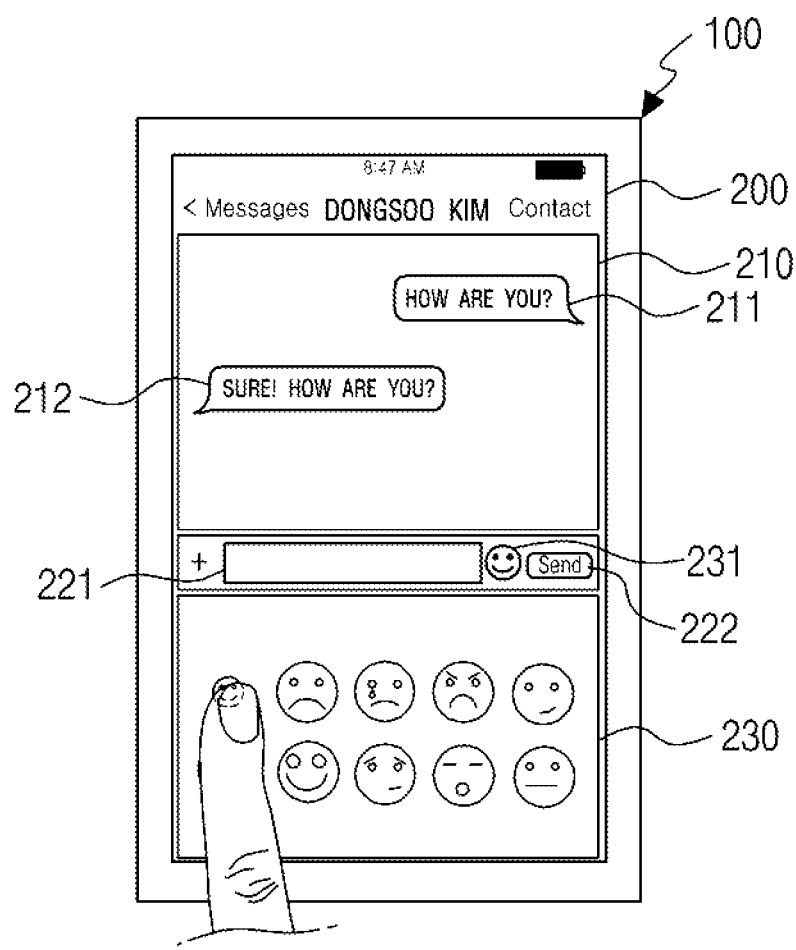
Figure 7C:
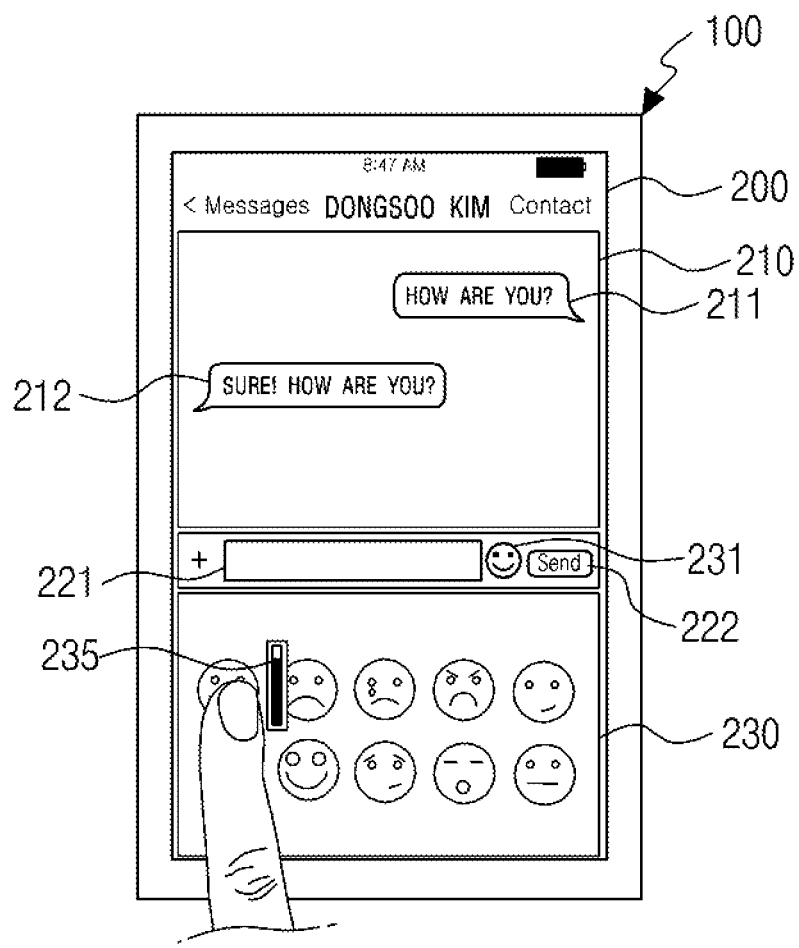

FIGS. 7a and 7c describe the changing the characteristic of the message in accordance with the second embodiment (S200) in the emotion transmission method according to the embodiment.

The message window 200 according to the embodiment of the present invention may include the message input window 221 to which a message to be transmitted to the terminal of the receiver is input and may include the emoticon key 231 for inputting an emoticon to the message input window 221. As the emoticon key 231 of the message window 200 is touched, the corresponding emoticon area 230 may be displayed. Also, the message window 200 may include the dialogue window 210 in which the history of dialogue with the terminal of the receiver has been recorded. The message 211 written by the sender and the message 212 written by the receiver are recorded in the dialogue window 210 in time series.

The characteristic to be changed of the message may be determined as a basic characteristic previously set in the message. For example, the characteristic to be changed of the particular emoticon may be set as a size by the sender or by the initial setting of the terminal.

Specifically, when the message consists of the emoticon and the characteristic is the size, the changing the characteristic of the message will be described below.

Referring to FIGS. 7a and 7b, the size of the emoticon can be changed by using at least one of the magnitude of the touch pressure, touch area and touch time period.

Specifically, an example in which the characteristic of the message is changed by using the magnitude of the touch pressure will be described.

As shown in FIG. 7a, when the magnitude of the pressure of the input touch increases, the size of the emoticon may become larger in response to the increase of the magnitude of the touch pressure. Also, as shown in FIG. 7b, when the magnitude of the pressure of the input touch decreases, the size of the emoticon may become smaller in response to the decrease of the magnitude of the touch pressure. Here, the emoticon having the changed size may be displayed on the emoticon area 230. The sender checks the same feedback as the changed characteristic, thereby checking what size the sender himself/herself has selected.

Here, a state into which the characteristic of the message is changed may be determined by a predetermined touch type. Specifically, when a single touch is input, the characteristic of the message is changed into a first state, and when multiple touches are input, the characteristic of the message is changed into a second state different from the first state. For example, when the single touch is input to the emoticon, the characteristic of the message is changed into the first state where the size of the emoticon increases, and when the multiple touches are input to the emoticon, the characteristic of the message is changed into the second state where the size of the emoticon decreases. Therefore, when the single touch is input to the emoticon, the size of the emoticon becomes larger than that before the touch input. In this case, when the magnitude of the pressure of the input touch is large, the rate at which the size of the emoticon increases may become higher, and when the magnitude of the pressure of the input touch is small, the rate at which the size of the emoticon increases may become smaller. When the multiple touches are input to the emoticon, the size of the emoticon becomes smaller than that before the touch input. In this case, when the magnitude of the pressure of the input touch is large, the rate at which the size of the emoticon decreases may become higher, and when the magnitude of the pressure of the input touch is small, the rate at which the size of the emoticon decreases may become smaller.

Here, since the change of the size of the emoticon may be determined by the non-stepwise touch level, the size of the emoticon may be changed in a non-step manner in accordance with the increase and decrease of the pressure of the input touch.

Here, it has been described in FIGS. 7a and 7b that when the size of the emoticon is changed, the emoticon having the changed size is displayed on the emoticon area 230, so that the sender checks the same feedback as the changed characteristic. However, there is no limit to this. The sender may check a feedback different from the changed characteristic. For example, as shown in FIG. 7c, information on the changed size of the emoticon may be displayed on a digital bar 235 of the emoticon area. Therefore, the sender can check what size the sender himself/herself has selected. As such, through the emotion expression method according to the embodiment, the sender can check the changed characteristic of the message by using various feedbacks.

Here, the foregoing has described the method for determining the change of the size of the emoticon by the non-stepwise touch level. However, as described in FIGS. 6a and 6b, the change of the size of the emoticon may be also determined by the stepwise touch level.

As mentioned, the sender can transmit a big smile by increasing the size of the smiling emoticon to be transmitted, or can transmit a small smile by decreasing the size of the smiling emoticon to be transmitted.

Here, when the sender intends to change the non-stepwise touch level according to the magnitude of the touch pressure and/or touch area, the sender changes the magnitude of the touch pressure and/or touch area before finally selecting his/her desired non-stepwise touch level, thereby selecting his/her desired non-stepwise touch level. For example, while the sender touches the emoticon of the emoticon area 230 with his/her finger, the sender controls the magnitude of the touch pressure and/or touch area to his/her desired magnitude of the touch pressure and/or touch area, and then maintains the magnitude of the touch pressure and/or touch area for a time period longer than a predetermined time period, so that the sender can select his/her desired non-stepwise touch level. A process in which, after the sender selects his/her desired non-stepwise touch level by touching the emoticon of the emoticon area 230, the size of the emoticon is changed by releasing the finger from the touch screen is the same as that described in FIGS. 6*a* and 6*b*.

Figure 8A:
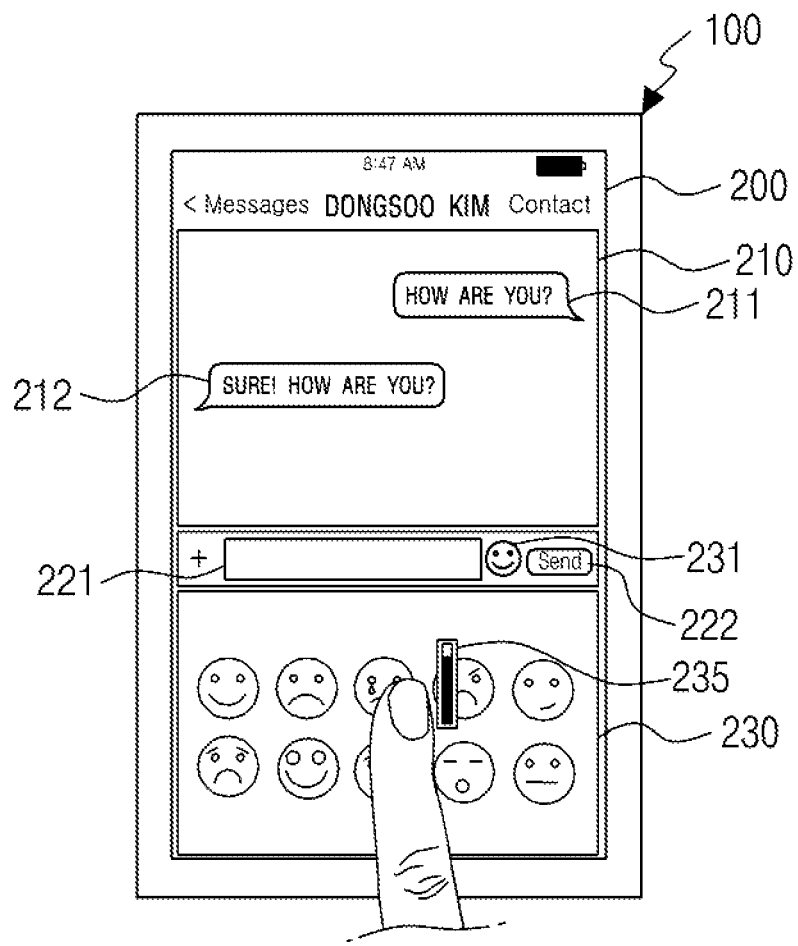
FIGS. 8a and 8b describe changing the state information of the characteristic in accordance with a third embodiment in the emotion transmission method according to the embodiment.
Figure 8B:
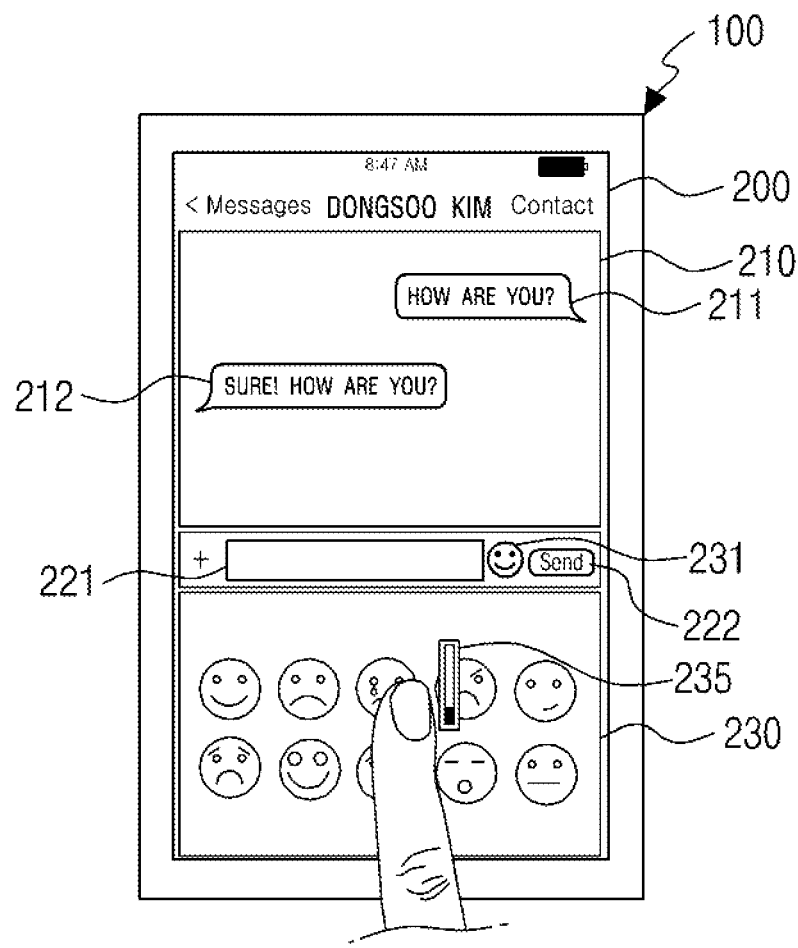

FIGS. 8*a* and 8*b* describe changing the state information of the characteristic in accordance with the third embodiment (S200) in the emotion transmission method according to the embodiment.

The characteristic to be changed of the message may be determined as a basic characteristic previously set in the message. For example, the characteristic to be changed of the sound may be set as the volume and the characteristic to be changed of the vibration may be set as the intensity by the sender or by the initial setting of the terminal.

Specifically, when the message consists of the sound and the vibration and the characteristics are the volume of the sound and the intensity of the vibration respectively, the changing the characteristic of the message will be described below.

Referring to FIGS. 8*a* and 8*b*, the volume of the sound and the intensity of the vibration can be changed by using at least one of the magnitude of the touch pressure, touch area, and touch time period.

Specifically, an example in which the characteristic of the message is changed by using the magnitude of the touch pressure will be described.

As shown in FIG. 8*a*, when the magnitude of the pressure of the touch input to the emoticon including the sound and the vibration of the emoticon area 230 increases, the volume of the sound and the intensity of the vibration may increase in response to the increase of the magnitude of the touch pressure. Also, as shown in FIG. 8*b*, when the magnitude of the pressure of the touch input to the emoticon including the sound and vibration of the emoticon area 230 decreases, the volume of the sound and the intensity of the vibration may decrease in response to the decrease of the magnitude of the touch pressure.

Here, since the change of the volume of the sound and the change of the intensity of the vibration may be determined by the non-stepwise touch level, the volume of the sound and the intensity of the vibration may be changed in a non-step manner in accordance with the increase and decrease of the pressure of the input touch.

Here, as shown in FIGS. 8*a* and 8*b*, information on the changed volume of the sound and information on the changed intensity of the vibration may be displayed on the digital bar 235 of the emoticon area. Therefore, the sender can check what sizes the volume and intensity that the sender himself/herself has selected have. The sender checks a feedback different from the changed characteristic, thereby checking what sizes the volume and intensity that the sender himself/herself has selected have.

Here, it has been described in FIGS. 8*a* and 8*b* that when the volume of the sound and the intensity of the vibration are changed, the digital bar 235 is displayed on the emoticon area 230, so that the sender checks the changed characteristics. However, there is no limit to this. The sender may check the same feedback as the changed characteristic. For example, the sender can check the volume of the sound through a sound output means like a speaker of the terminal 100 and can check the intensity of the vibration through a vibration output means of the terminal 100. As such, through the emotion expression method according to the embodiment, the sender can check the changed characteristic of the message by using various feedbacks.

Here, the foregoing has described the method for determining the changes of the volume of the sound and the intensity of the vibration by the non-stepwise touch level. However, as described in FIGS. 6*a* and 6*b*, the changes of the volume of the sound and the intensity of the vibration may be also determined by the stepwise touch level.

As mentioned, the sender can transmit much sadness by increasing the volume of the sound to be transmitted or can transmit a little sadness by decreasing the volume of the sound to be transmitted. Also, the sender can transmit much sadness by increasing the intensity of the vibration to be transmitted or can transmit a little sadness by decreasing the intensity of the vibration to be transmitted.

A process in which the sender selects his/her desired non-stepwise touch level by touching the emoticon including the sound and the vibration of the emoticon area 230 and a process in which the sizes of the volume of the sound and the intensity of the vibration are changed by releasing the finger from the touch screen are the same as those described in FIGS. 7*a* and 7*b*.

Figure 9:
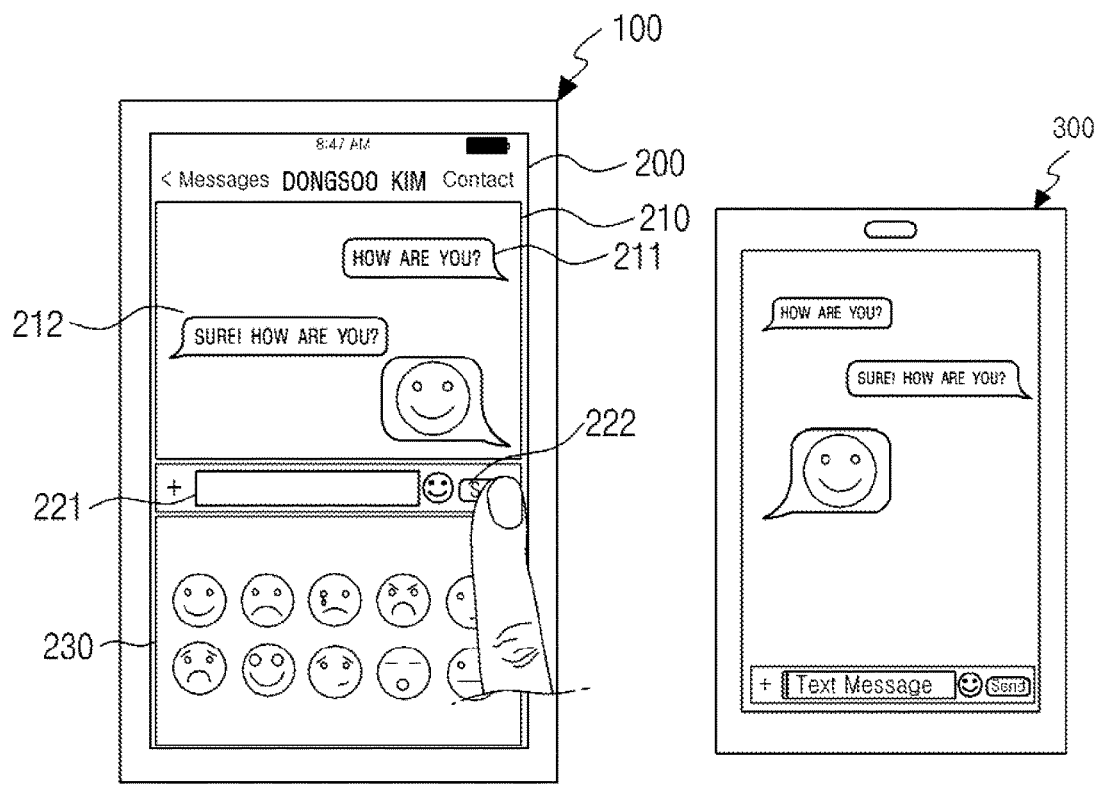
FIG. 9 describes transmitting a message including the state information to a terminal of a receiver in the emotion transmission method according to the embodiment.

FIG. 9 describes transmitting the message with the changed characteristic to the terminal of the receiver (S400) in the emotion transmission method according to the embodiment. Specifically, FIG. 9 shows that the emoticon having the larger size shown in FIG. 7*a* has been displayed on the terminal 100 of the sender and the terminal 300 of the receiver respectively.

Referring to FIG. 9, the sender performs an input action, for example, presses a particular button, and the like, and thus, transmits the message to be transmitted to the receiver's terminal.

For example, as shown in FIG. 9, the selected emoticon can be transmitted by pressing a send button 222. The result transmitted to the terminal 300 of the receiver may be displayed on the terminal 100 of the sender and on the dialogue window 210.

Also, after changing the characteristic of the message, the sender can transmit the message with the changed characteristic to the terminal 300 of the receiver by releasing the input touch. That is, the process of pressing the send button 222 is omitted and the characteristic of the message to be transmitted is changed by inputting the touch. Then, the input touch is released, so that the characteristic-changed message to be transmitted can be transmitted to the terminal 300 of the receiver.

Described is a case in which the change of the size of the emoticon shown in FIG. 7*a* is determined by the stepwise touch level. For example, it is considered that a case where the sender intends to transmit the emoticon of which the size is changed into a size corresponding to the four level. When the input touch is released in order to transmit the emoticon, the touch level passes through the third to first level from the fourth level during the release of the touch, and then the touch will be released. Here, when the touch level stays in each level for a period of time shorter than a predetermined period of time, the controller 110 is set such that the corresponding touch level is not selected. Therefore, it is possible to prevent the characteristic-changed message corresponding to an incorrect touch level from being transmitted at the time of releasing the touch.

When the sender transmits the characteristic-changed message to be transmitted to the terminal 300 of the receiver, the characteristic-changed message may be output to the terminal 300 of the receiver.

For example, as shown in FIG. 7*a*, in the case where the size of the emoticon becomes larger, when the send button 222 is pressed, the emoticon having the larger size may be displayed on the terminal 100 of the sender and the terminal 300 of the receiver respectively.

Also, for example, when the sound having the increased volume is, as described in FIG. 8*a*, transmitted to the terminal 300 of the receiver, the sound having the increased volume may be output to the terminal 300 of the receiver through the speaker.

Here, the foregoing has described that the message with one changed characteristic is transmitted to the terminal of the receiver. However, there is no limit to this. According to the embodiment of the present invention, the emotion transmission method according to the touch pressure, touch area and touch time period can transmit the message with a plurality of changed characteristics to the terminal of the sender.

Specifically, after the first characteristic is changed, the second characteristic different from the first characteristic is changed. Then, the send button is touched, so that the message with a plurality of changed characteristics can be transmitted to the terminal of the sender.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A method for transmitting emotions in accordance with a touch pressure, a touch area and a touch time period, the method comprising:
    detecting at least one of the magnitude of the touch pressure, touch area, and touch time period of a touch input to a touch screen;
    determining a first characteristic of a plurality of characteristics of a pre-existing message to be changed in response to the detected at least one of the magnitude of the touch pressure, touch area, and touch time period;
    changing the first characteristic of the pre-existing message in accordance with the detected at least one of the magnitude of the touch pressure, touch area, and touch time period; and
    transmitting the pre-existing message with the changed first characteristic,
    wherein the touch input on the touch screen is on the preexisting message.

2. The method of claim 1, wherein determining the first characteristic of the pre-existing message includes determining a stepwise touch level of the touch by using the detected at least one of the magnitude of the touch pressure, touch area, and touch time period, and changing the first characteristic in accordance with the determined stepwise touch level.

3. The method of claim 1, wherein determining the first characteristic of the pre-existing message includes determining a non-stepwise touch level of the touch by using the detected at least one of the magnitude of the touch pressure, touch area, and touch time period, and changing the first characteristic in accordance with the determined non-stepwise touch level.

4. The method of claim 1, wherein the pre-existing message comprises at least one of a visual message, an auditory message and a tactile message.

5. The method of claim 4, wherein the plurality of characteristics of the visual message comprises at least one of thickness, size, color, text font, moving direction, moving speed, the existence of an underline, brightness, saturation, and transparency.

6. The method of claim 4, wherein the plurality of characteristics of the auditory message comprises at least one of volume, frequency, rhythm, tempo, and melody.

7. The method of claim 4, wherein the plurality of characteristics of the tactile message comprises at least one of intensity, frequency, rhythm, and tempo.

8. The method of claim 1, wherein, in changing the first characteristic of the pre-existing message, when the touch is a single touch, the first characteristic of the pre-existing message is changed into a first state and when the input touch is multiple touches, the first characteristic of the pre-existing message is changed into a second state.

9. The method of claim 1, wherein the transmitting the pre-existing message comprises displaying the pre-existing message with the changed first characteristic on the touch screen.

10. The method of claim 1, wherein changing the first characteristic of the pre-existing message comprises checking the changed first characteristic through a feedback which is the same as the changed first characteristic.

11. The method of claim 1, wherein changing the first characteristic of the pre-existing message comprises checking the changed first characteristic through a feedback which is different from the changed first characteristic.

12. The method of claim 1, wherein, in the transmitting the pre-existing message, the pre-existing message with the changed first characteristic is transmitted by releasing the input touch.

13. The method of claim 1, wherein, in determining the first characteristic to be changed of the pre-existing message, when the touch is a single touch, the first characteristic to be changed of the pre-existing message is changed into a first state and when the input touch is multiple touches, the first characteristic to be changed of the pre-existing message is changed into a second state.

14. The method of claim 1, wherein the touch input on the touch screen is in an input window displaying the pre-existing message.

15. A terminal for transmitting emotions in accordance with a touch pressure, a touch area and a touch time period, the terminal comprising:
   a touch screen;
   a communication module;
   a processor which detects at least one of a magnitude of the touch pressure and touch area of the touch input to the touch screen; and
   a controller which determines a first characteristic of a pre-existing message in response to the at least one of the magnitude of the touch pressure and touch area of the touch, changes the first characteristic of the pre-existing message from first characteristics to second characteristics in accordance with the at least one of the magnitude of the touch pressure and touch area of the touch, and transmits the pre-existing message with the changed first characteristic through the communication module,
   wherein the touch input on the touch screen is on the preexisting message.

16. A terminal for transmitting emotions in accordance with a touch pressure, a touch area and a touch time period, the terminal comprising:
   a touch screen;
   a communication module;
   a processor which detects a capacitance change amount due to the touch input to the touch screen; and
   a controller which calculates a touch time period of the touch by using the capacitance change amount, determines a first characteristic of a pre-existing message in response to the touch time period of the touch, changes the first characteristic of the pre-existing message in accordance with the touch time period of the touch, and transmits the pre-existing message with the changed first characteristic through the communication module,
   wherein the touch input on the touch screen is on the preexisting message.

17. A terminal for transmitting emotions in accordance with a touch pressure, a touch area and a touch time period, the terminal comprising:
   a touch screen;
   a communication module;
   a processor which detects at least one of a magnitude of the touch pressure and touch area of the touch input to the touch screen and detects a capacitance change amount due to the touch; and
   a controller which calculates the touch time period by using the capacitance change amount, determines a first characteristic of a pre-existing message in response to at least one of the magnitude of the touch pressure, touch area, and touch time period of the touch, changes the first characteristic of the pre-existing message in accordance with the at least one of the magnitude of the touch pressure, touch area, and touch time period of the touch, and transmits the pre-existing message with the changed first characteristic through the communication module,
   wherein the touch input on the touch screen is on the preexisting message.

\* \* \* \* \*